United States Patent
Ofek et al.

(10) Patent No.: US 7,307,989 B2
(45) Date of Patent: Dec. 11, 2007

(54) WINDOW FLOW CONTROL WITH COMMON TIME REFERENCE

(75) Inventors: Yoram Ofek, Riverdale, NY (US); Mario Baldi, Cuneo (IT)

(73) Assignee: TrustedFlow Systems, Inc., Skokie, IL (US)

( * ) Notice: Subject to any disclaimer, the term of this patent is extended or adjusted under 35 U.S.C. 154(b) by 1058 days.

(21) Appl. No.: 10/390,500

(22) Filed: Mar. 17, 2003

(65) Prior Publication Data
US 2003/0174700 A1   Sep. 18, 2003

Related U.S. Application Data

(60) Provisional application No. 60/365,148, filed on Mar. 16, 2002.

(51) Int. Cl.
*H04L 12/28* (2006.01)
(52) U.S. Cl. ........................ 370/389; 370/508
(58) Field of Classification Search ................ 370/389, 370/508
See application file for complete search history.

(56) References Cited

U.S. PATENT DOCUMENTS

| | | | | |
|---|---|---|---|---|
| 5,751,244 | A * | 5/1998 | Huston et al. | 342/357.03 |
| 5,948,040 | A * | 9/1999 | DeLorme et al. | 701/201 |
| 6,038,230 | A * | 3/2000 | Ofek | 370/389 |
| 6,259,695 | B1 * | 7/2001 | Ofek | 370/389 |
| 6,272,131 | B1 * | 8/2001 | Ofek | 370/389 |
| 6,272,132 | B1 * | 8/2001 | Ofek et al. | 370/389 |
| 6,754,210 | B1 * | 6/2004 | Ofek | 370/389 |
| 6,760,328 | B1 * | 7/2004 | Ofek | 370/389 |
| 6,934,322 | B2 * | 8/2005 | King et al. | 375/150 |
| 6,973,090 | B2 * | 12/2005 | Ofek et al. | 370/400 |
| 2001/0038628 | A1 * | 11/2001 | Ofek et al. | 370/392 |
| 2002/0018475 | A1 * | 2/2002 | Ofek et al. | 370/503 |
| 2002/0080828 | A1 * | 6/2002 | Ofek et al. | 370/539 |
| 2002/0080829 | A1 * | 6/2002 | Ofek et al. | 370/539 |
| 2003/0011513 | A1 * | 1/2003 | Zhao et al. | 342/357.09 |
| 2003/0177374 | A1 * | 9/2003 | Yung et al. | 713/189 |
| 2003/0177381 | A1 * | 9/2003 | Ofek et al. | 713/200 |
| 2003/0177382 | A1 * | 9/2003 | Ofek et al. | 713/200 |
| 2003/0177383 | A1 * | 9/2003 | Ofek et al. | 713/200 |
| 2003/0177391 | A1 * | 9/2003 | Ofek et al. | 713/201 |

(Continued)

OTHER PUBLICATIONS

Douglas Comer, "Internetworking with TCP/IP: Principles, Protocols, and Architecture," Apr. 1988, ISBN: 0134701542, Prentice-Hall, Englewood Cliffs, NJ, USA.

(Continued)

*Primary Examiner*—Steven Nguyen
*Assistant Examiner*—Phuongchau Ba Nguyen
(74) *Attorney, Agent, or Firm*—Sitrick & Sitrick

(57) ABSTRACT

This invention relates generally to a method and apparatus for timely forwarding, discarding, and delivering data packets over the network and to their destination nodes and the optimization of data transfer throughput through the network. The timely forwarding and discarding are possible thanks to the standard global common time reference (CTR) that is known as UTC (Coordinated Universal Time). UTC is available from GPS (Global Positioning System), Galileo, and GLONASS (Global Navigation Satellite System). Data transfer throughput optimization is pursued by taking advantage of the timely forwarding and discarding properties to improve the data packets transfer flow control mechanisms, such as the sliding window re-sizing algorithm implemented by the widely deployed Transmission Control Protocol (TCP).

43 Claims, 24 Drawing Sheets

U.S. PATENT DOCUMENTS

2004/0198394 A1* 10/2004 Syrjarinne et al. ....... 455/456.1
2004/0230797 A1* 11/2004 Ofek et al. ................. 713/168
2006/0234724 A1* 10/2006 Syrjarinne et al. ....... 455/456.1
2007/0040734 A1*  2/2007 Evers et al. ................. 342/126

OTHER PUBLICATIONS

W. Richard Stevens, "TCP/IP Illustrated, vol. 1: The Protocols," Dec. 1993, ISBN: 0201633469, Addison-Wesley, USA.

Chung-Sheng Li, Yoram Ofek, Adrian Segall, Khosrow Sohraby, "Pseudo-Isochronos Cell Forwarding," 1998, pp. 2359-2372, Computer Networks and ISDN Systems, 30.

Mario Baldi, Yoram Ofek, "End-to-End Delay Analysis of Videoconferencing over Packet-Switched Networks," Aug. 2000, pp. 479-492, IEEE/ACM Transactions on Networking, vol. 8, No. 4.

K. Ramakrishnan, S. Floyd, D. Black "The Addition of Explicit Congestion Notification (ECN) to IP," Sep. 2001, TeraOptic Networks, RFC 3168.

* cited by examiner

Fig. 8
FIG. 8A
FIG. 8B
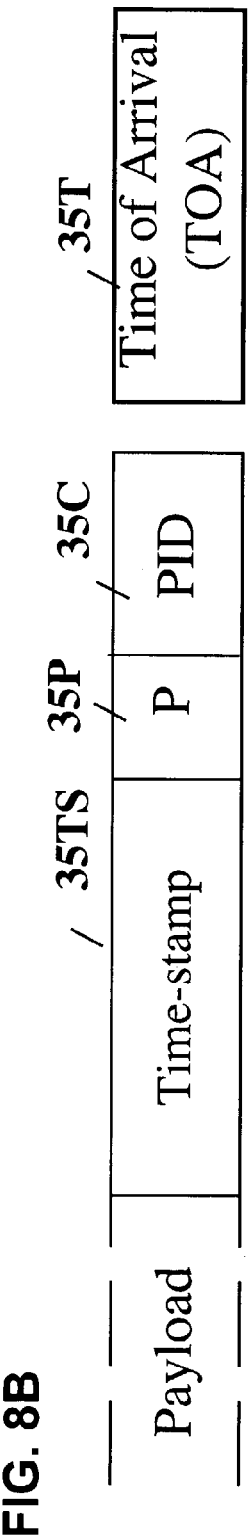

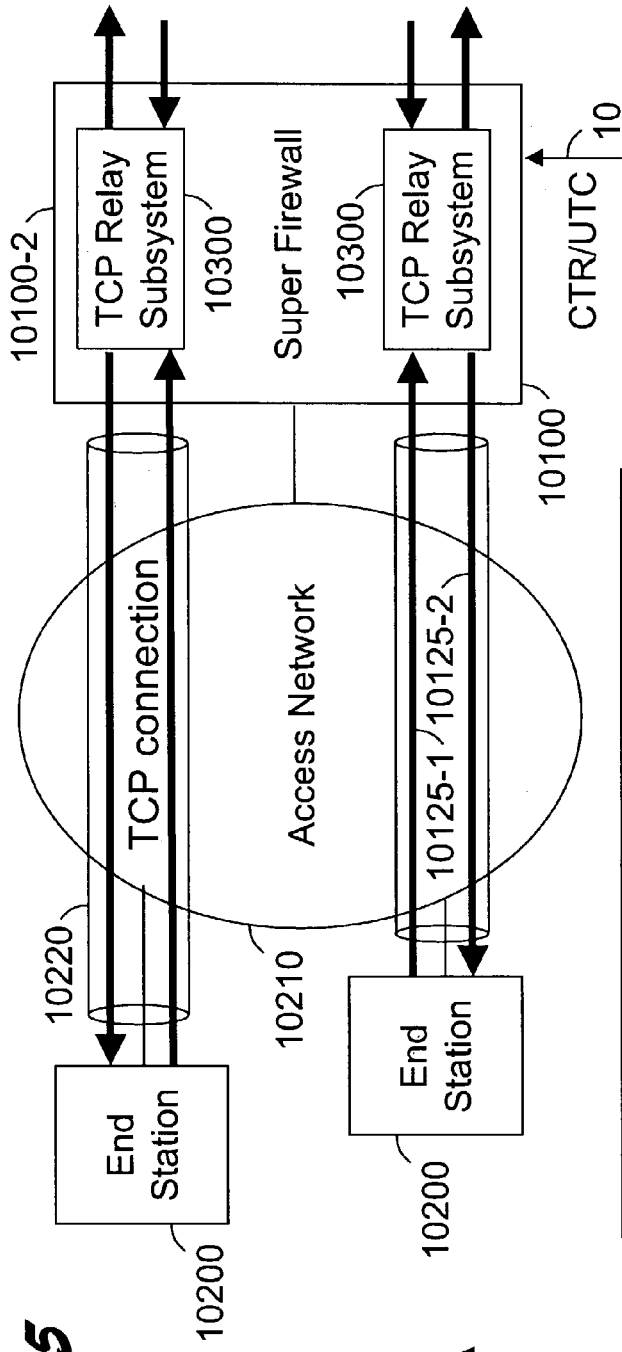
FIG. 15A
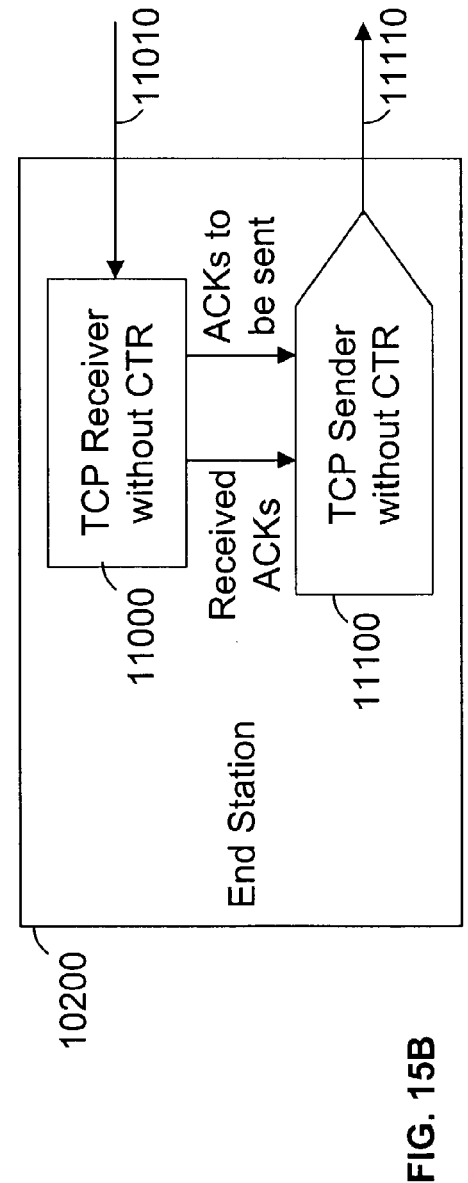
FIG. 15B
Fig. 15

WINDOW FLOW CONTROL WITH COMMON TIME REFERENCE

RELATED APPLICATIONS

This application claims priority from the Provisional Patent Application with Ser. No. 60/365,148; entitled, "BEST EFFORT LINEARIZATION OF TCP PACKET FLOWS," filed Mar. 16, 2002.

FEDERALLY SPONSORED RESEARCH OR DEVELOPMENT

Not applicable.

BACKGROUND OF THE INVENTION

The Internet success is the result of the IP architecture's robustness, flexibility, and ability to scale, and NOT on its efficiency, optimization, security, fine-grained control or performance guarantees. Furthermore, TCP/IP data networks are still suffering from some basic (quite inherent) problems, such as, denial of service attacks and unstable throughput.

The unstable throughput problem is the result of the "Saw-toothed-like" behavior of Internet's TCP (transport control protocol). Consequently, the Internet suffers from unstable end-to-end delay. As a result, the Internet is not as attractive to certain revenue generating applications, such as, streaming voice and video, and large file transfer.

The current invention will improve the performance of TCP/IP flows to a degree rivaling the performance of transmission over a dedicated leased line. This will impact the world wide web performance: (i) higher efficiency web operation with predictable throughput, (ii) lower delay web operation—better user satisfaction, and (iii) more deterministic guarantee delay for streaming media over the web.

Under the aforementioned prior art methods for providing packet switching services, switches and routers operate asynchronously. The present invention provides real-time services by synchronous methods that utilize a time reference that is common to the switches and end stations comprising a wide area network. The common time reference can be realized by using UTC (Coordinated Universal Time), which is globally available via, for example, GPS (Global Positioning System), Galileo, GLONASS (Global Navigation Satellite System). By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) is responsible for coordinating with the International Bureau of Weights and Measures (BIPM) in Paris in maintaining UTC (see http://www.boulder.nist.gov/timefreq).

1. Field and Context of the Invention

This invention relates generally to a method and apparatus for transmitting data on a communications network. More specifically, this invention relates to timely forwarding, discarding, and delivering data over the network and to their destination nodes and the optimization of data transfer throughput through the network.

The timely forwarding and discarding are possible thanks to time information—called a common time reference—that is globally available from GPS (Global Positioning System), Galileo, and GLONASS (Global Navigation Satellite System). Consequently, end-to-end performance parameters, such as, delay and jitter, can have either deterministic or probabilistic bounds.

Data transfer throughput optimization is pursued by taking advantage of the timely forwarding and discarding properties to improve the data transfer flow control mechanisms. For example, the widely deployed Transmission Control Protocol (TCP) uses a window based flow control mechanism according to which a sliding window is resized in order to avoid overloading receiver and network, on the one side, and taking advantage of all available network resources, on the other side. Traditional TCP window size control algorithms are not very efficient, because they are based on an often inaccurate estimate of the round trip time that has a high variability on traditional asynchronous networks. The timely forwarding disclosed herein allows the round trip time and round trip time variations to be bound and known in advance. This invention relates to a TCP window size control algorithm that uses knowledge on round trip delay bound and round trip delay variation bound to change the window size such that throughput is maximized.

2. Background of the Invention: Prior Art

In traditional telephone networks the user of the telephone device cannot over burden the network with signals beyond the allocated circuit it gets. On the other hand, in software operations and thus in computer communication networks, a user gets access to the software in its station, the same software which is in charge of regulating the user himself. As a result users can "control" the network rather than the network controlling the users.

Indeed, it is assumed that there is availability of logic (i.e., software) of methods for controlling communication and for preparation of data packets for transmissions. The description is given in numerous books: ["Internetworking with TCP/IP" by D. E. Comer, Prentice-Hall, Third Edition, 1995, ISBN 0-13-216987-8]; and ["TCP/IP Illustrated, Vol. 1: The Protocols" by W. R. Stevens, Addison-Wesley, Reading, Mass. 1994].

Synchronous methods are found mostly in circuit switching, as compared to packet switching that uses mostly asynchronous methods. However, some packet switching synchronous methods have been proposed. IsoEthernet or IEEE 802.9a combines CSMA/CD (IEEE 802.3), which is an asynchronous packet switching with N-ISDN and H.320, which is circuit switching over existing Ethernet infrastructure (10Base-T). This is a hybrid solution with two distinct switching methods: N-ISDN circuit switching and Ethernet packet switching. The two methods are separated in the time domain by time division multiplexing (TDM). The IsoEthernet TDM uses fixed allocation of bandwidth for the two methods—regardless of their utilization levels. This approach to resource partitioning results in undesirable side effects like under-utilization of the circuit switching part while the asynchronous packet switching is over loaded but cannot use the idle resources in the circuit switching part.

There are methods that use a common time reference for regulating the forwarding of packets through the network. In ["Pseudo-isochronous cell forwarding" by C-S. Li, Y. Ofek, A. Segall, and K Sohraby, Computer Networks and ISDN Systems, 30:2359-2372, 1998], a packet is forwarded one hop every time frame in a manner similar to the execution of instructions in a Reduced Instruction Set Computer (RISC) machine. However, such methods use reservation of network resources for providing deterministic quality of service, thus providing support for real time applications. Given the periodic nature of resource reservation and network operation, such methods are optimal for periodic variable bit rate traffic, such as videoconferencing: ["End-to-end Delay Analysis of Videoconferencing over Packet Switched Networks" by M. Baldi and Y. Ofek, IEEE/ACM Transactions on Networking, Vol. 8, No. 4, August 2000, pp. 479-492]. Instead, the method for packet forwarding described in the present disclosure, uses a common time reference to provide a best effort service without necessarily requiring previously reserved network resources. Such service is particularly suitable to traditional data applications, such as file transfers, that do not have real-time constraints, and should be able to maximize their throughput by using any unused network resources.

Many traditional data applications are based on reliable transfer protocols, such as the Transmission Control Protocol (TCP), that use either window based or rate based flow control mechanisms. TCP flow control is based on a sliding window that is resized in order to avoid overloading receiver and network, on one side, and taking advantage of all available network resources, on the other side. TCP window size control algorithms are not very efficient; this invention uses properties derived from the deployment of a common time reference for the forwarding of best effort packets to improve the efficiency of the window size control algorithm.

SUMMARY OF THE INVENTION

This invention is based on the availability in network nodes of a common time reference (CTR), divided in time intervals called time frames. The common time reference can be realized using UTC (Coordinated Universal Time) that can be distributed through several systems, such as, but not limited to: (i) GPS (Global Positioning System) (ii) GLONASS (Global Navigation Satellite System)—Russian Federation (iii) Galileo—European Union and Japan, and (iv) TWTFT (Two-Way Satellite Time and Frequency Transfer). The accuracy required for UTC distribution is ½ time frame in case time frame delimiters are deployed and multiple time frames in case time stamps are deployed in addition to time frame delimiters.

In a possible embodiment of this invention, at the access points to the network, e.g., end-systems, access servers, and firewalls, time stamps derived from UTC are used adaptively for jitter removal, thereby, linearizing the TCP packet flows. Furthermore, in this invention, time-driven packet forwarding or discard with advance queue management (AQM) is used together with: (i) differentiated services (ii) packet priorities and (iii) random early discard (RED)—i.e., "best effort" with time-driven RED ["The Addition of Explicit Congestion Notification (ECN) to IP" IETF Request for Comments: 3168—K. Ramakrishna, S. Floyd and D. Black].

This invention relates generally to a method and apparatus for controlling and policing the transmission of data packets across a communications network. This invention enables designated points inside the network and at the network edges (e.g., firewalls, end-systems, routers, access servers) to control the level of packet traffic in predefined time intervals and secure the flow of data.

BRIEF DESCRIPTION OF THE DRAWINGS

FIGS. 8A and 8B illustrate two generic data packet headers with pipe ID (PID), and priority bit (P), wherein FIG. 8A illustrates a packet without a time-stamp field, and wherein FIG. 8B illustrates a packet with a time-stamp field, and also shows how the common time-reference value, time of arrival (TOA), is attached to the data by the temporal mapping and routing controller;

FIG. 15A is a system for controlling the transmission of data packets between at least one of a plurality of End Stations and an access point through an Access Network;

FIG. 15B is the architecture of an End Station comprising a TCP Sender without CTR Subsystem and a TCP Receiver without CTR Subsystem;

DETAILED DESCRIPTION OF THE PREFERRED EMBODIMENT

Figure 1:
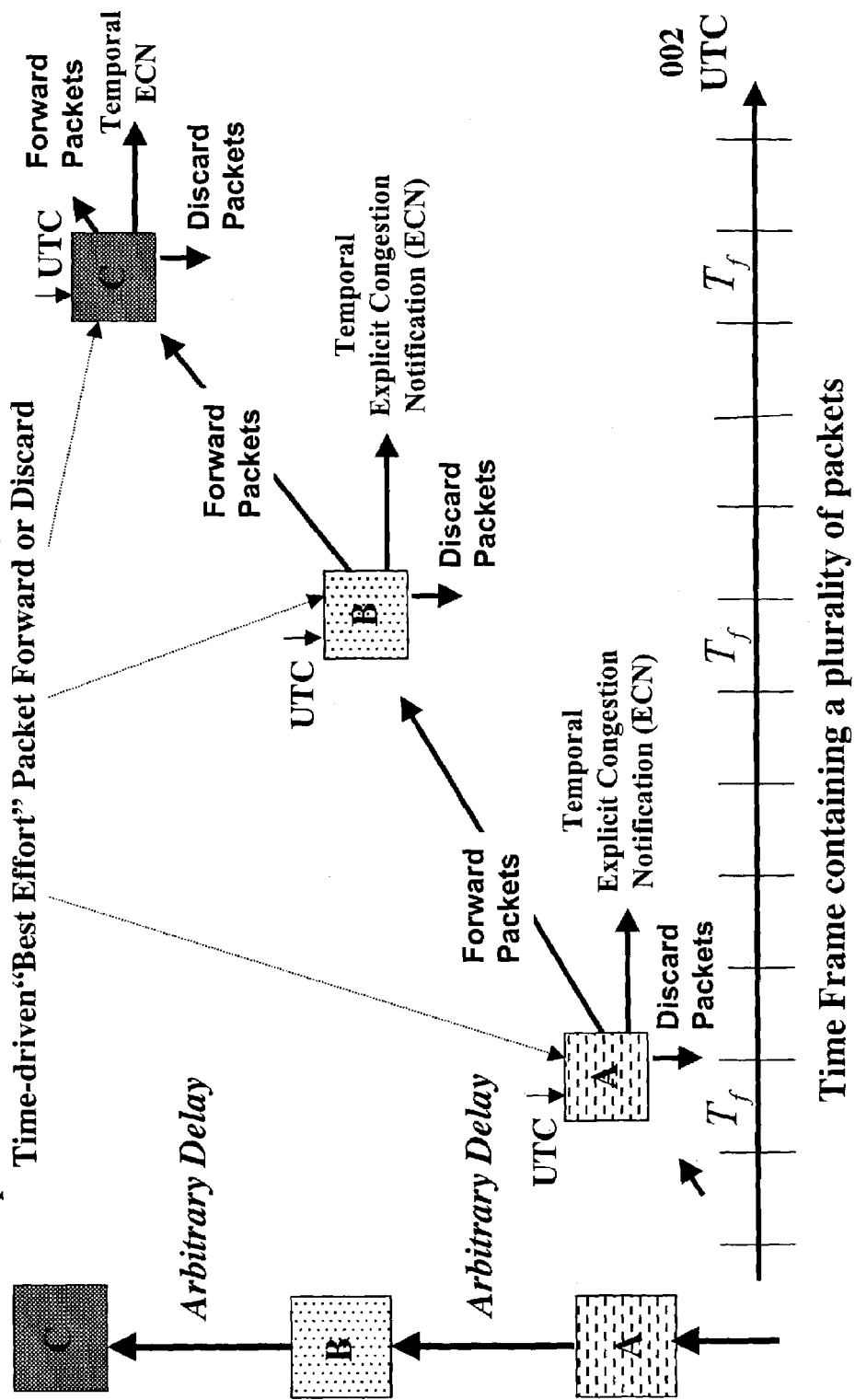
FIG. 1 is a schematic illustration of a sequence of network switches that are coupled to UTC (coordinated universal time) that functions as a common time reference (CTR). The CTR is used for realizing a novel advanced queue management (AQM) of "Best Effort" traffic that is called time-driven random early discard (RED). As shown, in a possible embodiment in case of congestion a temporal ECN (explicit congestion notification) signal is forwarded to the sending source.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Best Effort with Common Time Reference

The present invention relates to a system and method for security and policing of the transmission and forwarding of data packets over a packet switching network. The switches of the network maintain a common time reference, which is obtained either from an external source (such as GPS—Global Positioning System, GLONASS—Global Navigation Satellite System—Russian Federation, Galileo—European Union and Japan, and TWTFT—Two-Way Satellite Time and Frequency Transfer) or is generated and distributed internally. The time intervals are arranged in simple periodicity and complex periodicity (like seconds and minutes of a clock). A packet that arrives to an input port of a switch, is switched to an output port based on specific routing information in the packet's header (e.g., IPv4 destination address in the Internet, VCI/VPI labels in ATM). Each switch along a route from a source to a destination forwards packets in periodic time intervals that are predefined using the common time reference. The time interval duration can be longer than the time duration required for transmitting a packet, in which case the exact position of a packet in the time interval is not predetermined.

Packets that are forwarded from one source to multiple destinations share the same pipe ID and the links and time intervals on which they are forwarded comprise a virtual tree. This facilitates controlled delay forwarding from one input port to multiple output ports, and consequently, from one source to multiplicity of destinations. Packets that are destined to multiple destinations reach all of their destinations in predefined time intervals and with delay jitter that is no larger a predefined time duration.

A system is provided for managing data transfer of data packets from a source to a destination. The transfer of the data packets is provided during a predefined time interval, comprised of a plurality of predefined time frames. The system is further comprised of a plurality of switches. A common time reference signal is coupled to each of the switches, and a time assignment controller assigns selected predefined time frames for transfer into and out from each of the respective switches responsive to the common time reference signal. For each switch, there is a first predefined time frame within which a respective data packet is transferred into the respective switch, and a second predefined time frame within which the respective data packet is forwarded out of the respective switch. The time assignment provides consistent fixed intervals between the time between the input to and output from the system for managing data transfer.

In a preferred embodiment, there is a predefined subset of the predefined time frames during which the data packets are transferred in the switch, and for each of the respective switches, there are a predefined subset of the predefined time frames during which the data packets are transferred out of the switch.

Each of the switches is comprised of one or a plurality of addressable input and output ports. The data packets that arrive at each one of the input ports of the respective switch are mapped (temporally mapped) to a respective one or more of the output ports of the respective switch by the temporal mapping and routing controller.

For each of the data packets, there is an associated time of arrival (TOA) to a respective one of the input ports. The time of arrival is associated with a particular one of the predefined time frames. For each of the mappings by the temporal mapping and routing controller, there is an associated mapping by a scheduling controller, which maps of each of the data packets between the time of arrival and forwarding time out. The forwarding time out is associated with a specified predefined time frame.

In the preferred embodiment, there are a plurality of the virtual pipes comprised of at least two of the switches interconnected via communication links in a path. The communication link is a connection between two adjacent switches; and each of the communications links can be used simultaneously by one, two, or more of the virtual pipes. Multiple data packets can be transferred utilizing at least two of the virtual pipes.

There is a fixed time difference, which is constant for all switches, between the time frames for the associated time of arrival and forwarding time out for each of the data packets. The fixed time difference is a variable time difference for some of the switches. A predefined interval is comprised of a fixed number of contiguous time frames comprising a time cycle. Data packets that are forwarded over a given virtual pipe are forwarded from an output port within a predefined subset of time frames in each time cycle. Furthermore, the number of data packets that can be forwarded in each of the predefined subset of time frames for a given virtual pipe is also predefined.

The time frames associated with a particular one of the switches within the virtual pipe are associated with the same switch for all the time cycles, and are also associated with one of input into or output from the particular respective switch.

There is a constant fixed time between the input into and output from a respective one of the switches for each of the time frames within each of the time cycles. A fixed number of contiguous time cycles comprise a super-cycle, which is periodic. Data packets that are forwarded over a given virtual pipe are forwarded from an output port within a predefined subset of time frames in each super-cycle. Furthermore, the number of data packets that can be forwarded in each of the predefined subset of time frames within a super-cycle for a given virtual pipe is also predefined.

Figure 3:
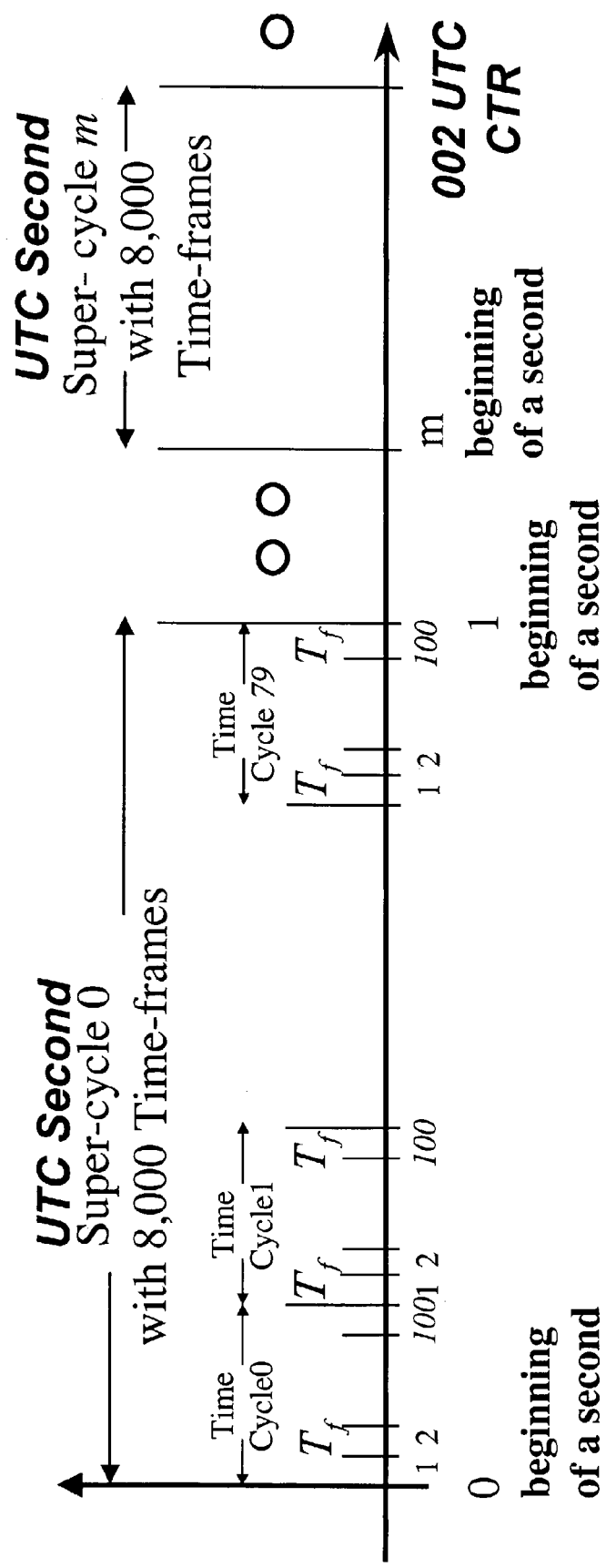
FIG. 3 is a schematic illustration of a possible relationship of the network common time reference and UTC (Coordinated Universal Time), such that, each time-cycle has 100 time frames, of 125 microseconds each, and 80 time-cycles are grouped into one super-cycle of one second.

In the preferred embodiment the common time reference signal is coupled from at least one of GPS (Global Positioning System), GLONASS (Global Navigation Satellite System)—Russian Federation, Galileo—European Union and Japan, and TWTFT (Two-Way Satellite Time and Frequency Transfer), and is in accordance with the UTC (Coordinated Universal Time) standard. As shown in FIG. 3 the UTC is divided in a predefined manner into time frames, Tf, of equal duration, typically Tf=125 microseconds. The time frames are grouped into time cycles. Each time cycle has predefined number of time frames. Referring to FIG. 3, there are 100 time frames in each time cycle. Contiguous time cycles are grouped together into contiguous super-cycles, and as shown in FIG. 3, there are 80 time cycles in each super-cycle. In one embodiment, the super-cycle duration is equal to one second as measured using the UTC (Coordinated Universal Time) standard. The super-cycle can also be equal to multiple UTC seconds or a fraction of a UTC second.

The UTC time signal does not have to be received directly from at least one of GPS, GLONASS, Galileo, and TWTFT, such signal can be received by using various means, as long as the delay or time uncertainty associated with that UTC time signal does not exceed a maximum tolerated value. The accuracy required for UTC distribution is ½ time frame in case time frame delimiters are deployed and multiple time frames in case time stamps are deployed in addition to time frame delimiters.

This disclosure described a system of data packet transmission control for controlling communications of data packets between a first node and a second node, a UTC (Universal Coordinated Time) signal coupled to each of the first node and the second node, wherein the UTC signal is comprised of UTC seconds which are divided into a predefined number of UTC time-frames. The system comprises means for sending data packets from the first node to the second node within the UTC time-frames, means for receiving the data packets at the second node after a first defined delay, means for defining a UTR (unique time reference) time-frames at the second node representative of the UTC time-frames delayed by the first defined delay, a temporal mapping controller 35B (FIG. 6) for mapping the UTR time-frames to respective ones of the UTC time-frames responsive to the UTC signal and to the first defined delay, and means for outputting 40 (FIG. 2) the data packets from the second node after a predefined number of UTC time-frames responsive to the UTC signal and to the temporal mapping.

Figure 2:
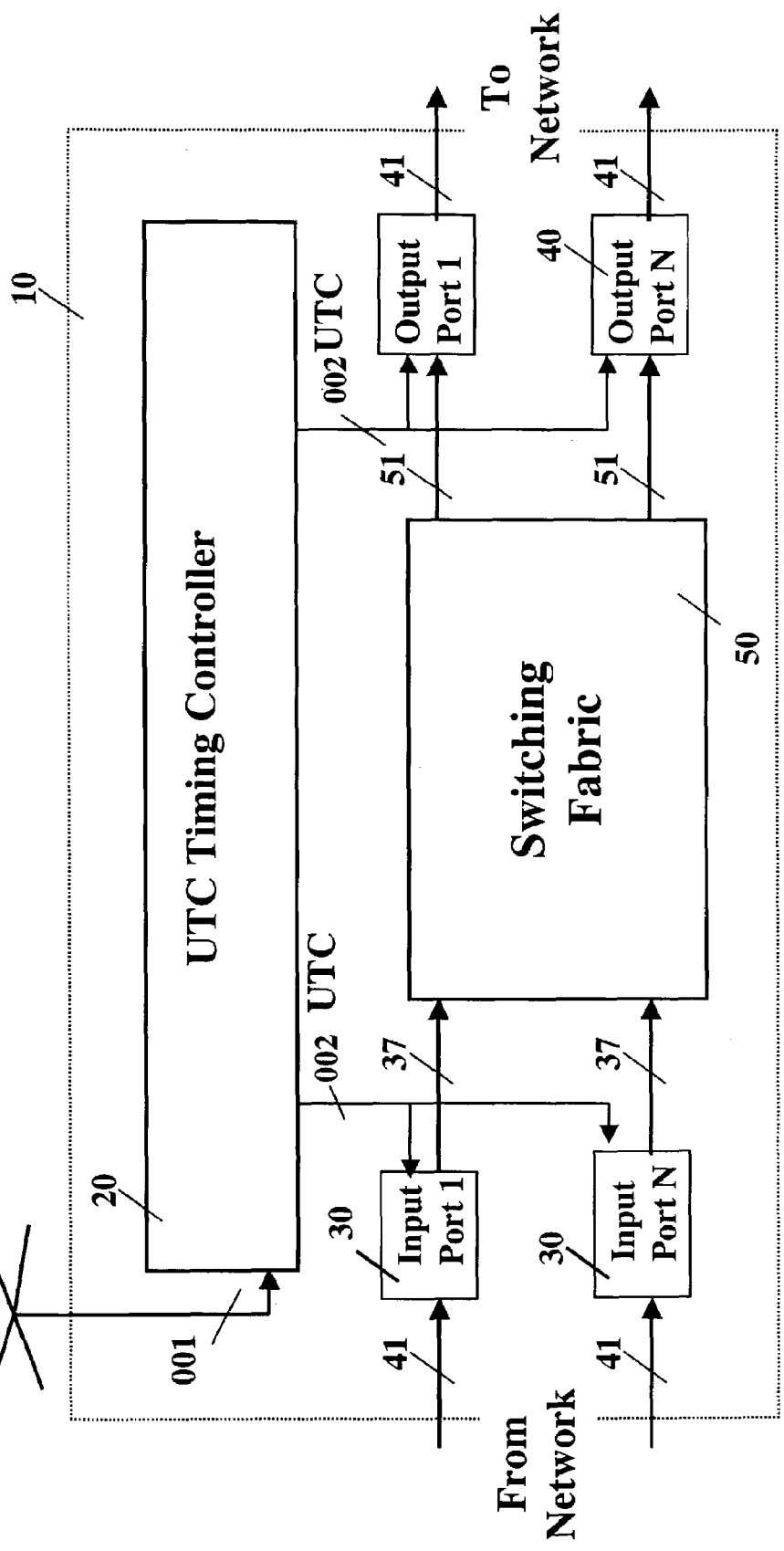
FIG. 2 is a schematic block diagram illustration of a switch that uses a common time reference (CTR) from the GPS (Global Positioning System), GLONASS, Galileo, or CDMA for the timely forwarding of "Best Effort" data packets, wherein the CTR is coupled to the UTC timing controller, disclosed in accordance with the present invention.

FIG. 2 illustrates the structure of a pipeline switch 10. The switch 10 is comprised of one or a plurality of input ports 30, one or a plurality of output ports 40, switching fabric 50, and UTC timing controller 20 with an antenna 001 compatible to at least one of, but not limited to, GPS, GLONASS, Galileo, and TWTF. The UTC timing controller 20 provides UTC 002 to all input and output ports.

The common time reference is divided in a predefined manner into time frames, Tf, of equal duration, as shown in FIG. 3, typically Tf=125 microseconds. The time frames are grouped into time cycles. Each time cycle has a predefined number of time frames. The time frames, time cycles, and super-cycles are associated in the same manner with all respective switches at all times.

FIG. 3 illustrates a possible embodiment of a structured common time reference aligned with the UTC (Coordinated Universal Time) standard. In this illustrated example, the duration of every super-cycle is exactly one second as measured by the UTC standard. Moreover, the beginning of each super-cycle coincides with the beginning of a UTC second, as shown in FIG. 3. Consequently, when leap seconds are inserted or deleted for UTC corrections (due to changes in the earth rotation period) the cycle and super-cycle periodic scheduling will not be affected.

The time frames, time cycles, and super-cycles are associated in the same manner with all respective switches within the virtual pipe at all times.

Figure 4:
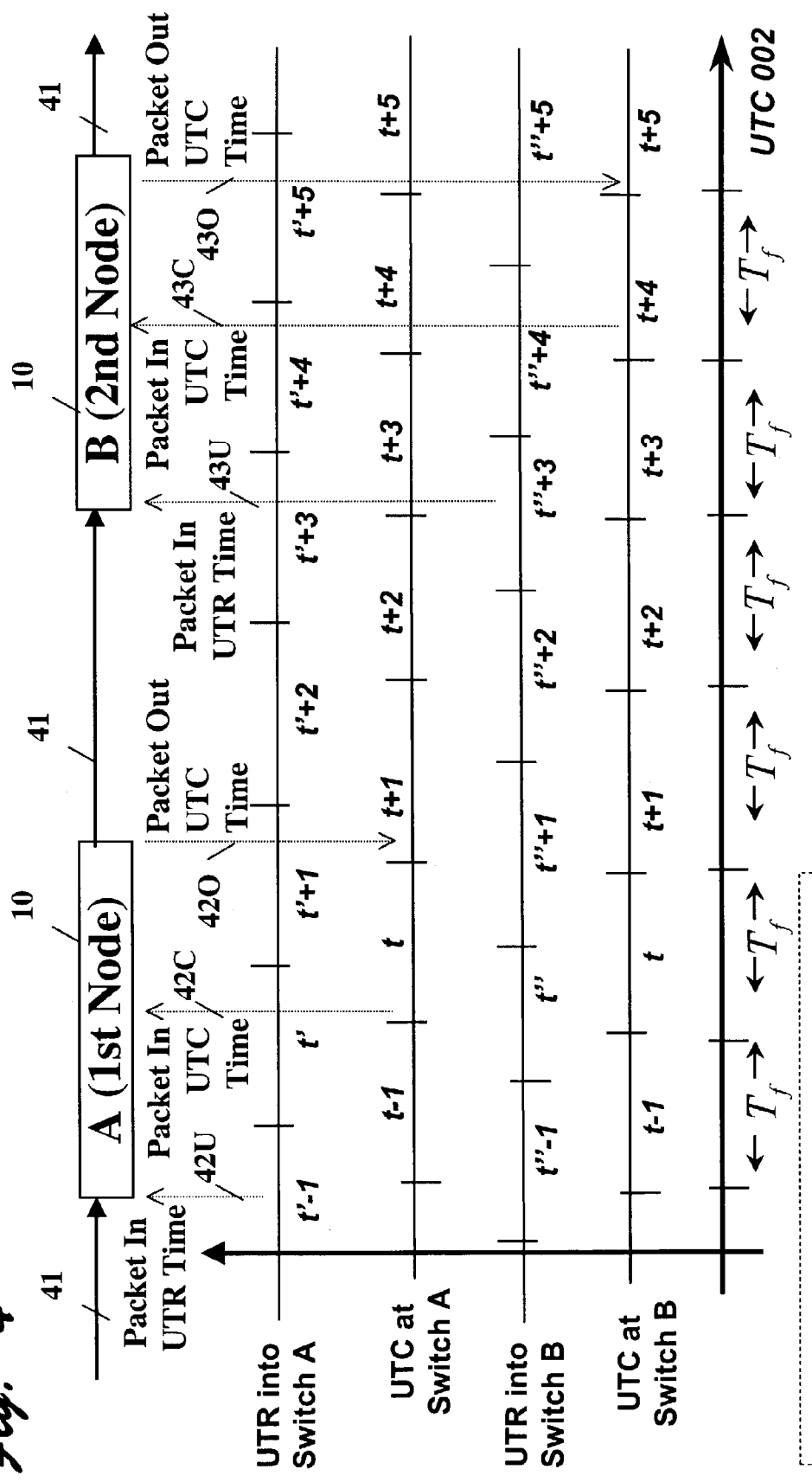
FIG. 4 is a schematic illustration of "Best Effort" data packets timely forwarding as in FIG. 1, and correlating to data packet movement through switches versus time for forwarding, wherein data packets arrive at each switch with a unique time reference (UTR) and then are temporally mapped inside the switch to CTR.

Pipeline forwarding relates to data packets being forwarded across a virtual pipe 25 with a predefined delay in every stage (either across a communication link 41 or across a switch 10 from input port 30 to output port 40). This sort of pipeline forwarding used in accordance with the present invention is illustrated in FIG. 4 and FIG. 1. As shown in FIG. 4, a data packet 42U received during time frame t'−1 of the input link's Unique Time Reference (UTR) is mapped by the Temporal Mapping & Routing Controller 35 in FIG. 5 of switch A onto time frame t of the UTC common time reference 42C for being forwarded out of switch A during time frame t+1 42O of the UTC common time reference. This data packet will reach switch B after a propagation delay on the link 41 between switch A and switch B and will be received 43U during time frame t"+3 of switch B's input link's Unique Time Reference (UTR) is mapped by the Temporal Mapping & Routing Controller 35 in FIG. 5 of switch B onto time frame t+4 of the UTC common time reference 43C for being forwarded out of switch B during time frame t+5 43O of the UTC common time reference.

This disclosure presents a method of data packet transmission control for controlling communications of data packets between a first node A 10 and a second node B 10 (see FIG. 4), a UTC (Universal Coordinated Time) signal coupled to each of the first node and the second node, wherein the UTC signal is comprised of UTC seconds which are divided into a predefined number of UTC time-frames. The method comprises sending data packets from the first node to the second node within the UTC time-frames, receiving the data packets at the second node after a first defined delay, defining a UTR (unique time reference) time-frames at the second node representative of the UTC time-frames delayed by the first defined delay, temporal mapping the UTR time-frames to respective ones of the UTC time-frames responsive to the UTC signal and to the first defined delay, and outputting the data packets from the second node after a predefined number of UTC time-frames responsive to the UTC signal and to the temporal mapping.

Each of the UTC and UTR time-frames are respectively further comprised of UTC and UTR time-frame delimiters (TFDs), wherein the temporal mapping is responsive to the UTR time-frame delimiters. The UTR time-frames are further comprised of the UTR time-frame delimiters, wherein the UTR time-frame delimiters are further comprised of a time-stamp assigned to the respective UTC time-frame delimiter at the sending, responsive to the UTC, wherein the temporal mapping is responsive to the time-stamp.

The time-frame delimiter is at least one of the following: a redundant serial codeword, an 8B/10B fiber channel redundant serial codeword, a 4B/5B FDDI redundant serial codeword, a pointer encoded in the SONET path overhead (POH), a pointer encoded in the SONET transport overhead (TOH), a position determined by counting data units, a control IP data packet, a control ATM cell, and a control MPLS data packet.

The packet forwarding method herein disclosed further comprises counting data units within the data packets to be forwarded to determine a data unit count and discarding selected ones of the data packets responsive to the respective data unit count exceeding a predefined number. In a possible embodiment, the selected ones of the data packets to be discarded are randomly selected, until the respective data unit count is less than a second predefined number.

In a possible embodiment of the packet forwarding method herein disclosed the communications of data packets from the second node B 10 (FIG. 4) is over a predefined number of N+1 additional nodes, the method further comprising summing the predefined number of UTC time-frames for all of the first, and not the additional, nodes and the second node, to define a summed, predefined number of UTC time-frames and wherein the choosing is responsive to the summed predefined number.

The communication links 41 can be of fiber optic, copper, and wireless communication links for example, between a ground station and a satellite, and between two satellites orbiting the earth.

The communication link between two nodes does not have to be a serial communication link. A parallel communication link can be used—such link can carry simultaneously multiple data bits, associated clock signal, and associated control signals.

In a possible embodiment the difference between the UTC time frame onto which a received packet is mapped 42C or 43C and the UTC time frame during which the packet is forwarded 42O or 43O, respectively, is constant and known in advance. Thus, the end-to-end delay experienced by packets is known in advance with a jitter of one time frame. In another possible embodiment called time-driven best effort or time-driven random early discard, the UTC time frame onto which a received packet is mapped 42C or 43C and the UTC time frame during which the packet is forwarded 42O or 43O, respectively, is bounded. As shown in FIG. 1, according to this novel advanced queue management (AQM) method called time-driven random early discard (TD-REM) packets received at each switch can be either forwarded to the next switch towards their destination, or discarded by the switch if the packet cannot be transmitted before the end of a predefined time frame. A plurality of packets can be forwarded during one time frame.

The service resulting from the application of the time-driven random early discard (TD-REM) AQM method disclosed in this invention is called time-driven "best effort" (TD-BE). In a possible embodiment a switch with at least one congested output port can generate a Temporal Explicit Congestion Notification (ECN) signal.

In the packet forwarding herein disclosed, the outputting further comprises counting the data units within the data packets to be forwarded to determine a data unit count and outputting an explicit congestion notification (ECN) signal responsive to respective data unit counts exceeding a predefined number. The ECN signal is comprised of at least one of the following: congestion time derived responsive to the UTC, congestion level and the data unit count, IDs of dropped data packets. The IDs of dropped data packets are at least one of: source IP address, destination IP address, IP port number, source address, destination address, VCI label in ATM, VPI label in ATM, MPLS label, Ethernet MAC source address, Ethernet MAC destination address.

Figure 5:
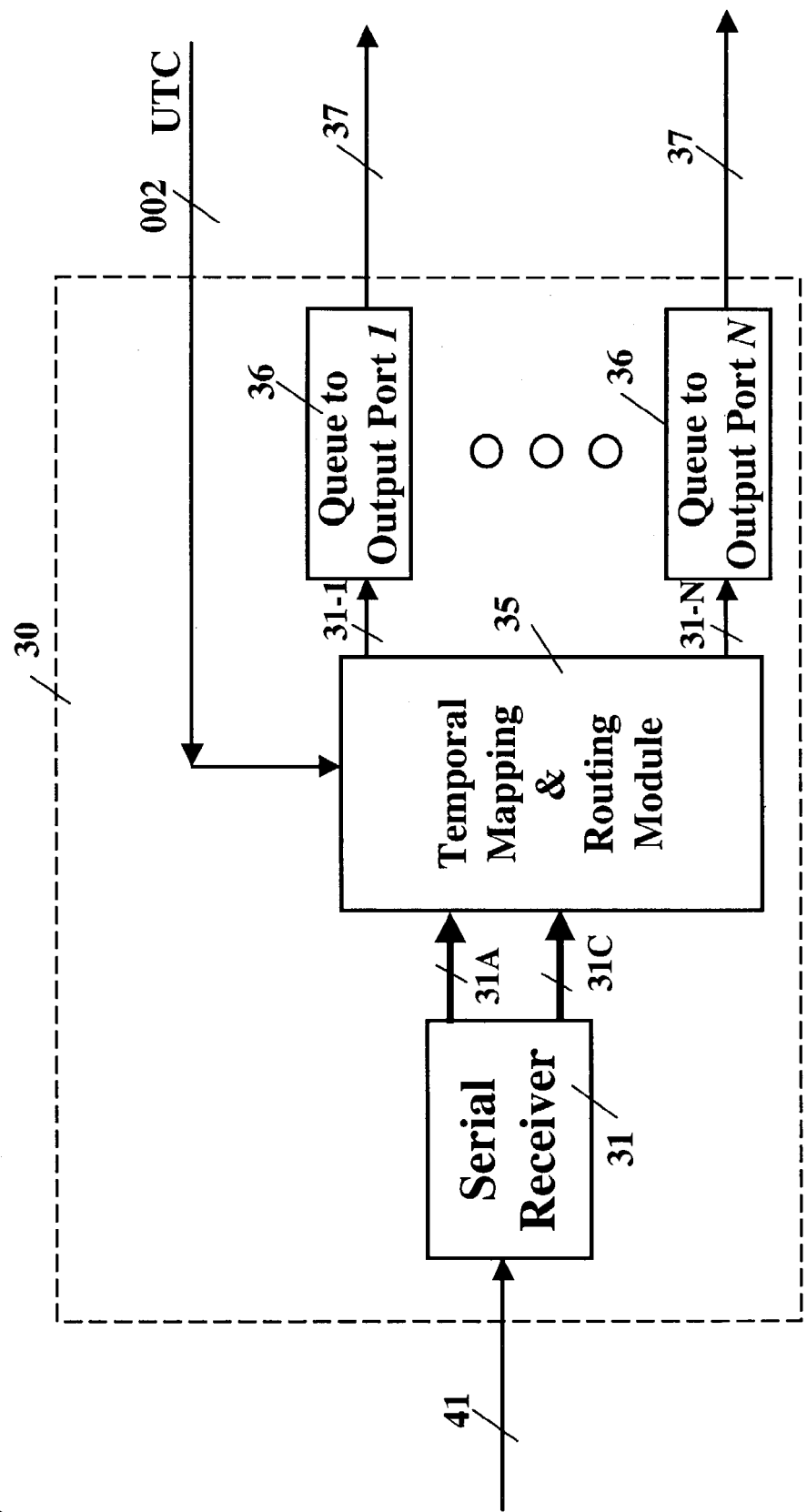
FIG. 5 is a schematic block diagram of an input port 30 with a temporal mapping and routing controller that is coupled to (i) a serial receiver and (ii) queues to the output ports.

As shown in FIG. 5, the input port 30 has three parts: serial receiver 31, a Temporal Mapping & Routing Module 35 and separate queues to the output ports 36. The serial receiver 31 transfers the data packets and the time frame delimiters to the Temporal Mapping & Routing Module 35.

Figure 6:
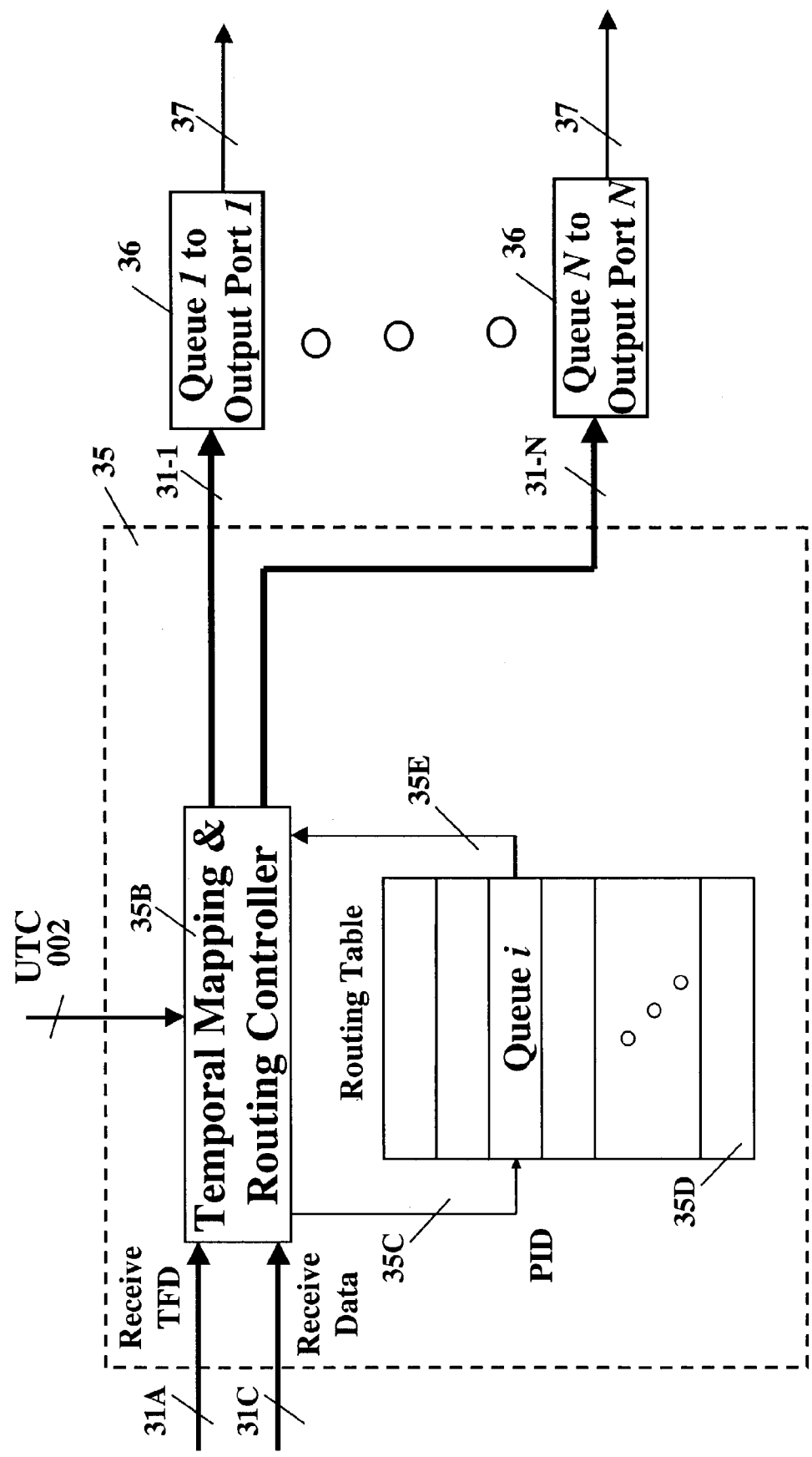
FIG. 6 is a schematic diagram of the temporal mapping and routing controller which determines to which output port an incoming data packet should be switched to and attaches a time of arrival (TOA) information to the data packet header responsive to the temporal mapping from UTR to UTC.

As shown in FIG. 6 the Temporal Mapping & Routing Module 35 is constructed of a Temporal Mapping and Routing Controller 35B that includes a central processing unit (CPU), a random access memory (RAM) for storing the data packet, and read only memory (ROM) for storing the routing controller processing program, and a routing table 35D that is used for determining the output port that the incoming data packet should be switched to.

The Temporal Mapping & Routing Controller 35B determines two possible associations of an incoming data packet: (i) the output port, and (ii) the time of arrival (TOA). The TOA is then used by the Best Effort Scheduling and Transmit Buffer Module 45 for determining when a data packet should be forwarded by the Select Buffer and Time-Driven Random Early Discard Controller 45D to the next switch on its path. The routing controller utilizes at least one of Internet protocol version 4 (IPv4), Internet protocol version 6 (IPv6) addresses, Internet protocol group multicast address, Internet MPLS (multi protocol label swapping or tag switching) labels, ATM virtual circuit identifier and virtual path identifier (VCI/VPI), and IEEE 802 MAC (media access control) addresses, for mapping from an input port to an output port.

As shown in FIG. 8B, the sending data packets is further comprised of assigning and associating a time-stamp 35TS to the data packets at the sending, responsive to the UTC, wherein the temporal mapping is responsive to the time-stamp. As illustrated in FIG. 8A and FIG. 8B, the incoming data packet header includes a virtual pipe identification, PID 35C, that is used to lookup in the routing table 35D the address 35E of the queue 36 that the incoming data packet should be transferred into. Before the packet is transferred into its queue 36, the time of arrival (ToA) 35T is attached to the packet header, as illustrated in FIGS. 8A and 8B, by the Temporal Mapping and Routing Controller 35B when the packet is received. The ToA 35T is used by the Best Effort Scheduling and Transmit Buffer Module 45 of the output port 40 in the computation of the forwarding time out of the output port, shown in FIG. 9.

The data packet can have various formats, such as, Internet protocol version 4 (IPv4), Internet protocol version 6 (IPv6), asynchronous transfer mode (ATM) cells, etc. The data packets PID can be determined by one of the following: an Internet protocol (IP) address, an asynchronous transfer mode (ATM) a virtual circuit identifier, a virtual path identifier (VCI/VPI), Internet protocol version 6 (IPv6) addresses, Internet MPLS (multi protocol label swapping or tag switching) labels, and IEEE 802 MAC (media access control) address, etc.

Figure 7:
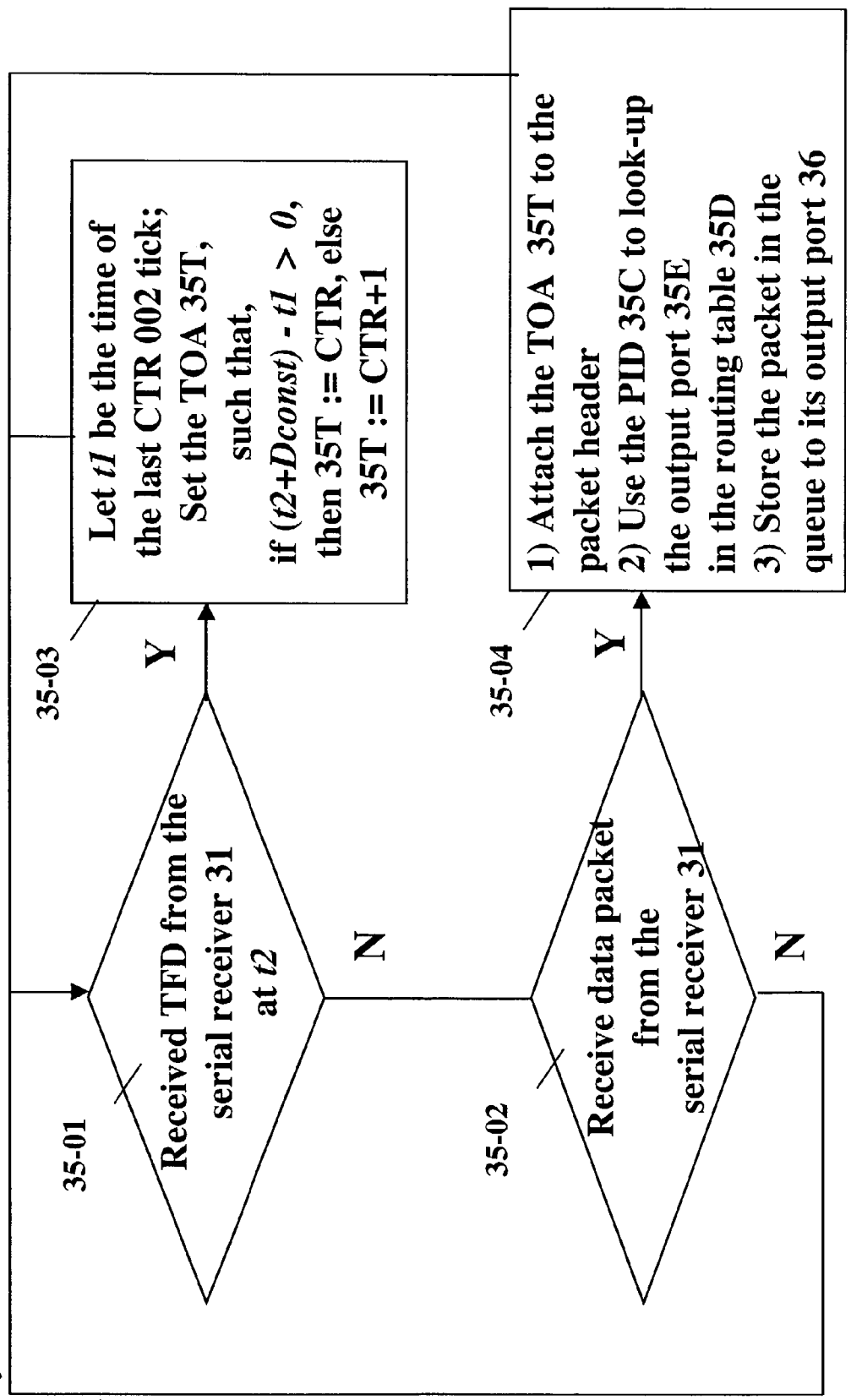
FIG. 7 illustrates the temporal mapping and routing controller operation.

FIG. 7 illustrates the flow chart for the routing controller processing program executed by the Temporal Mapping and Routing Controller 35B. The program is responsive to two basic events from the serial receiver 31 of FIG. 5: the received time frame delimiter (TFD) at step 35-01, and the receive data packet at step 35-02. After receiving a TFD, the Temporal Mapping and Routing Controller 35B computes the time of arrival (ToA) 35T value at step 35-03 that is attached to the incoming data packets. For this computation it uses a constant, Dconst, which is the time difference between the common time reference (CTR) 002 tick and the reception of the TFD at time t2 (generated on an adjacent switch by the CTR 002 on that node). This time difference is caused by the fact that the delay from the serial transmitter 49 to the serial receiver 31 is not an integer number of time frames. When the data packet is received at step 35-02, the Temporal Mapping and Routing Controller 35B executes three operations as set forth in step 35-04: attach the ToA, lookup the address of the queue 36 using the PID, and storing the data packet in that queue 36.

As shown in FIG. 8B, each of the data packets is comprised of a header, which includes an associated time-stamp field 35TS. In a possible embodiment realizing pipeline forwarding, for each of the mappings by the Temporal Mapping and Routing Controller 35B, there is an associated mapping by the Best Effort Scheduling and Transmit Buffer Module 45, of each of the data packets between the respective associated time-stamp 35TS and an associated forwarding time out, which is associated with one of the predefined time frames.

In another possible embodiment realizing time-driven RED for TD-BE, for each of the mappings by the Temporal Mapping and Routing Controller 35B, there is an associated mapping by the Best Effort Scheduling and Transmit Buffer Module 45, of each of the data packets between the respective associated time-stamp 35TS and an associated maximum forwarding time out, which is associated with one of the predefined time frames. In a possible embodiment the associated maximum forwarding time out can be determined by adding a predefined time amount to the TOA 35T associated to the data packet. In another possible embodiment, the associated maximum forwarding time out can be determined by adding a predefined time amount to the time-stamp 35TS associated to the data packet.

The time stamp 35TS can record the time in which a packet was created by its application. In one embodiment the time-stamp is generated by an Internet real-time protocol (RTP), and by a predefined one of the switches. The time-stamp 35TS can be used by a Best Effort Scheduling and Transmit Buffer Module 45 in order to determine the forwarding time of a data packet from an output port.

Each of the data packets originates from an end station, and the time-stamp 35TS is generated at the respective end station for inclusion in the respective originated data packet. Such generation of a time-stamp can be derived from UTC either by receiving it directly from at least one of, but not limited to, GPS, GLONASS, Galileo, TWTFT, and the Internet's Network Time Protocol (NTP).

Figure 9:
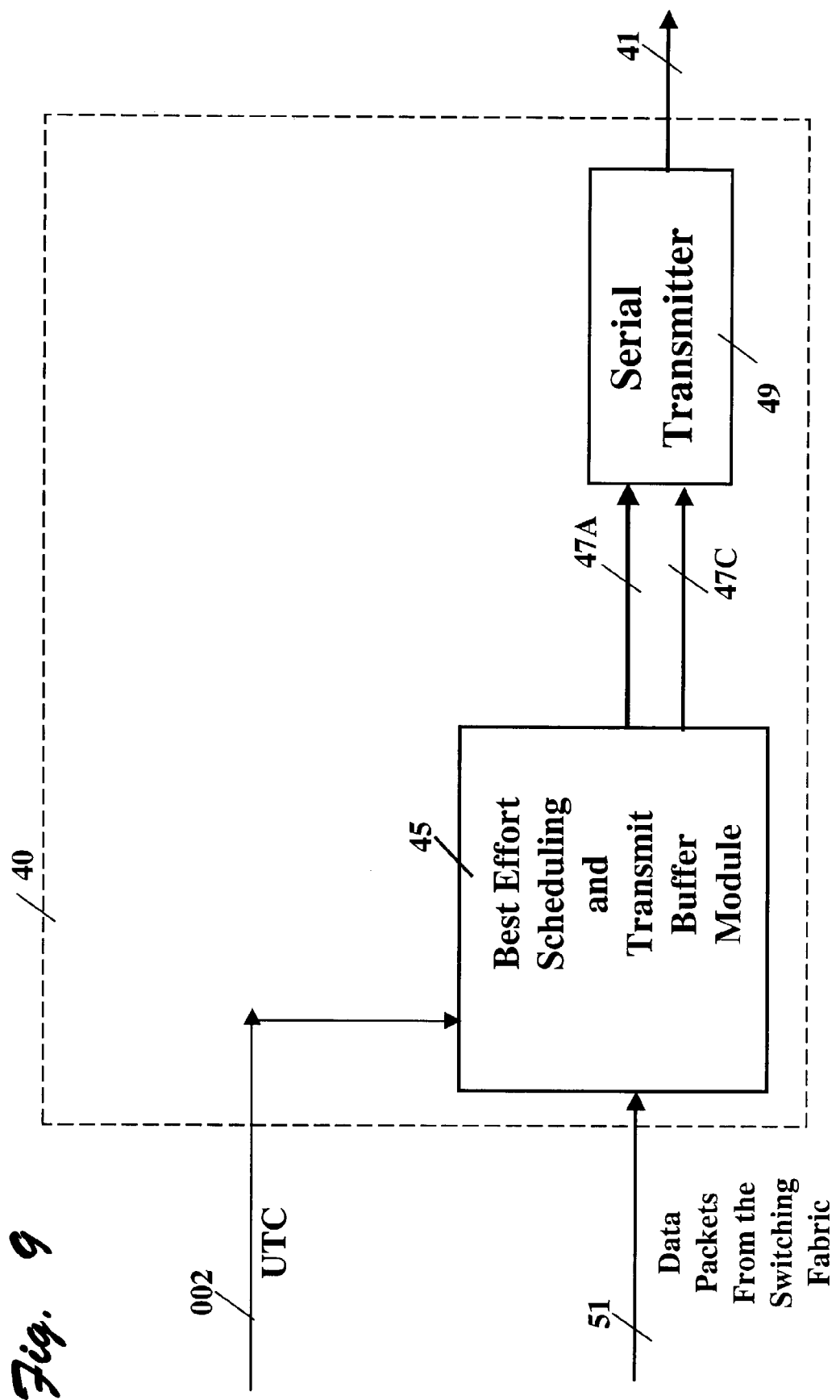
FIG. 9 is a schematic block diagram of an output port with its "best effort" scheduling controller and transmit buffer that is coupled to a serial transmitter.

The output port 40, illustrated in FIG. 9, is comprised of a Best Effort Scheduling and Transmit Buffer Module 45, and serial transmitter 49. The Best Effort Scheduling and Transmit Buffer Module 45 performs a mapping of each of the data packets between the associated respective time of arrival (ToA) 35T and an associated forwarding time out of the output port via the serial transmitter 49. The forwarding time is determined relative to the common time reference (CTR) 002.

Figure 10:
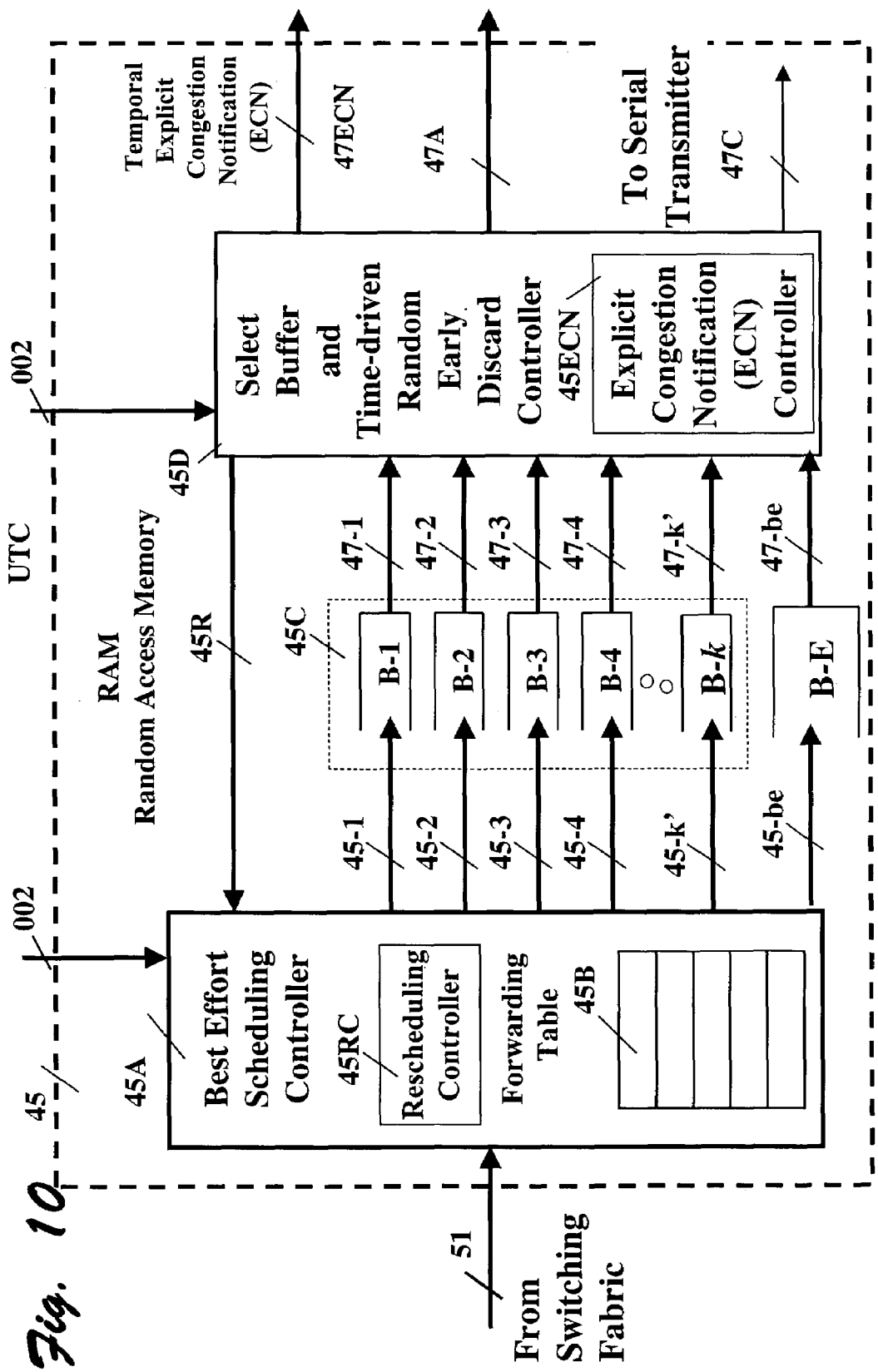
FIG. 10 is a functional block diagram of the "best effort" scheduling controller and transmit buffer including a the "best effort" scheduling controller and a select buffer and time driven random early discard (RED) controller that is coupled to an explicit congestion notification (ECN) controller.

FIG. 10 shows the architecture of the Best Effort Scheduling and Transmit Buffer Module 45, which includes a Best Effort Scheduling Controller 45A, a transmit buffer 45C, and a select buffer and time-driven random early discard controller 45D. The Best Effort Scheduling Controller 45A together with the select buffer and time-driven random early discard controller 45D perform the mapping of the data packet into the time frame. The mapping is done on the The Best Effort Scheduling Controller 45A using at least one of the PID 35C, the data packet time of arrival (ToA) 35T, and the data packet time-stamp 35TS in order to determine the respective time frame in which the respective packet should be forwarded out of the output port. The details are presented below. Both controllers, 45A and 45D, are constructed of a central processing unit (CPU), a random access memory (RAM) for storing the data, and read only memory (ROM) for storing the controller processing program.

In the more general configuration, depicted in FIG. 10, data packets that arrive from the switching fabric 50 via link 51 in which their priority bits 35P (P1/P2) are either "00" or "01" or "10" or "11" (i.e., either best effort traffic, or time-driven best effort traffic, or VBR traffic, or reserved CBR traffic, respectively) will be switched by the Best Effort Scheduling Controller 45A to one of the k+1 transmit buffers in 45C: B-1, B-2, . . . , B-k, B-E. Each of the buffers B-1, . . . B-k is designated to store packets that will be forwarded in each of the k time frames in every time cycle, that where defined in FIG. 3, wherein k=100. Another possible operation is to map the incoming packets separately to each of the time frames of a super-cycle. When a super-cycle mapping is implemented there are k*l transmit buffers in 45C: B-1, B-2, . . . , B-k*l, i.e., k buffers to each of the l cycles of a super-cycle (in FIG. 3 l=80). In another possible embodiment the transmit buffers in 45C are less than k or k*l and the buffers are collectively and circularly used to store packets for each of the k time frames in a time cycle or k*l time frames in a super-cycle, respectively.

In alternative embodiments the priority bits 35P (P1/P2) can be encoded in at lest one of, but not limited to, the differentiated services filed of an IP packet, another field of an IP packet, in a field of the IP header, in an additional field of a specific protocol, the IEEE 802.1p tag of an Ethernet/ IEEE 802.3 frame.

During each UTC time frame the select buffer and time-driven random early discard controller 45D retrieves packets from the respective one of the transmit buffers 45C and outputs the on data line 47C to the serial transmitter 49 for transmission on its respective communications link. Once the respective one of the transmit buffers 45C has been emptied, the select buffer and time-driven random early discard controller 45D retrieves packets from the best effort B-E buffer and outputs the on data line 47C to the serial transmitter 49 for transmission on its respective communications link.

The select buffer and time-driven random early discard controller 45D maps one of the time frames for output from a first switch to a second time frame for input via the communications link to a second switch. The select buffer and time-driven random early discard controller 45D uses the UTC time signal in order to identify the boundaries between two successive time frames. The select buffer and time-driven random early discard controller 45D generates a time frame delimiter (TFD) signal 47A to the serial transmitter 49 for transmission on its respective communications link in order to signal the second switch the exact boundary between two time frames.

Each of the data packets is encoded as a stream of data, and a time frame delimiter is inserted into the stream of data responsive to the select buffer controller. This can be implemented by using redundant serial codewords.

In a possible operation, when a data packet in a generic transmit buffer B-j cannot be retrieved and passed to the serial transmitter 49 for transmission on its respective communications link before the end of the respective time frame, the select buffer and time-driven random early discard controller 45D can be moved back to the Best Effort Scheduling Controller 45A. In this mode of operation the Best Effort Scheduling Controller 45A is comprised of a rescheduling controller 45RC that determines the new one of the transmit buffers 45C in which the packet should be stored while awaiting for transmission.

Figure 11:
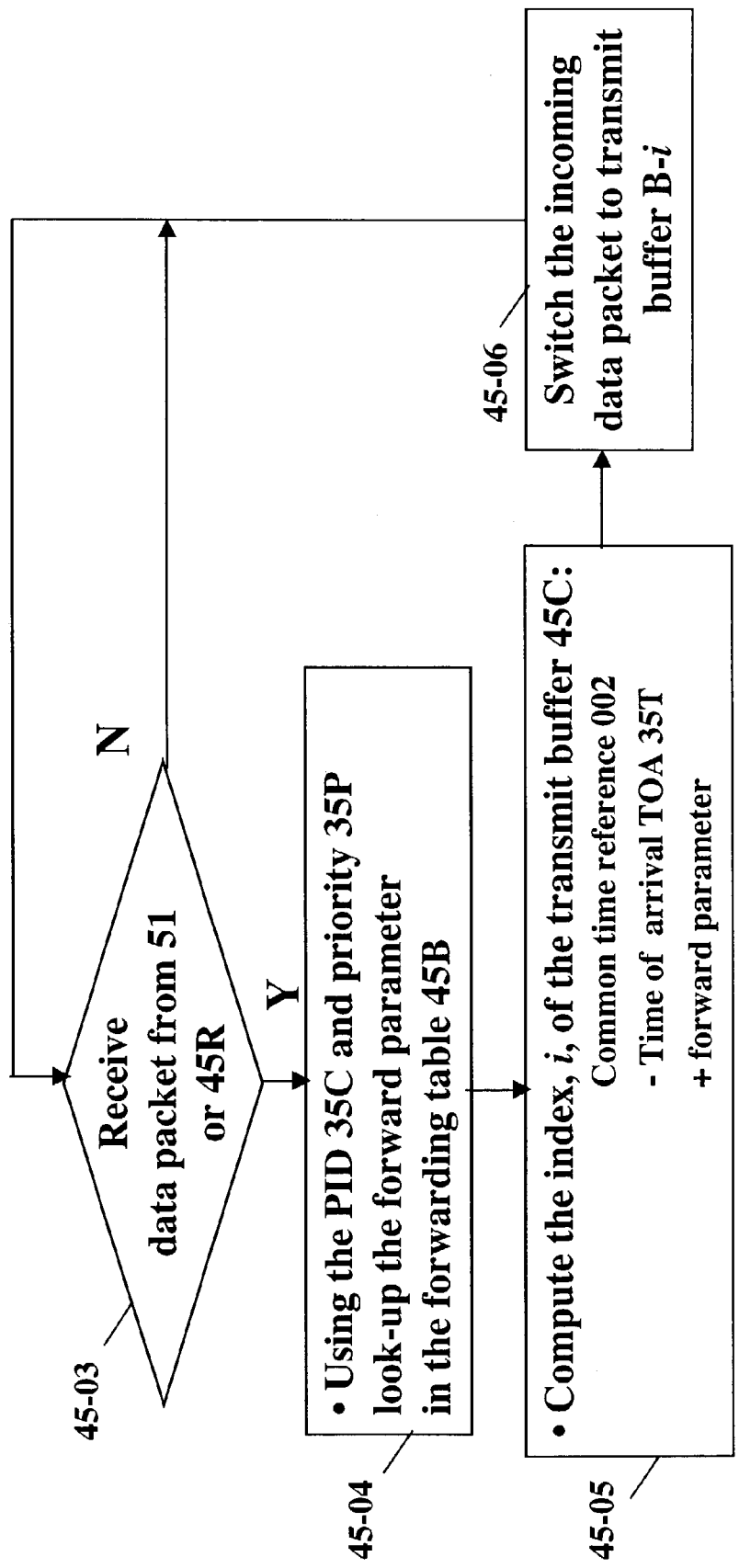
FIG. 11 is a flow diagram describing the packet "best effort" scheduling controller operation for computing the forwarding time of a packet based, among others, on the following input parameters: Pipe ID, TOA, and the UTC 002.

A possible program executed by the Best Effort Scheduling Controller 45A is described in FIG. 11. When a data packet is received from either the fabric via link 51 or from the select buffer and time-driven random early discard controller 45D via link 45R, as specified in 45-03, the 35C, 35T and 35P in the data packet header are used to look-up the forward parameter 45F in the forwarding table 45B, as specified in 45-04. Next, the index i of the transmit buffer, between B-1 and B-k, is computed in 45-05 by subtracting the time of arrival ToA 35T from the common time reference CTR 002 and by adding the forward parameter 45F, as specified in 45-05, and then switching the incoming data packet to transmit buffer B-i, as specified in 45-06.

Incoming data packets in which their priority bits 35P, P1/P2, are "00" (i.e., non-reserved traffic or "best effort") or received from line 45R (i.e., rescheduled packet) are switched by the Best Effort Scheduling Controller 45A and the rescheduling controller 45RC to the transmit "best effort" buffer B-E via link 45-*be*.

Figure 12:
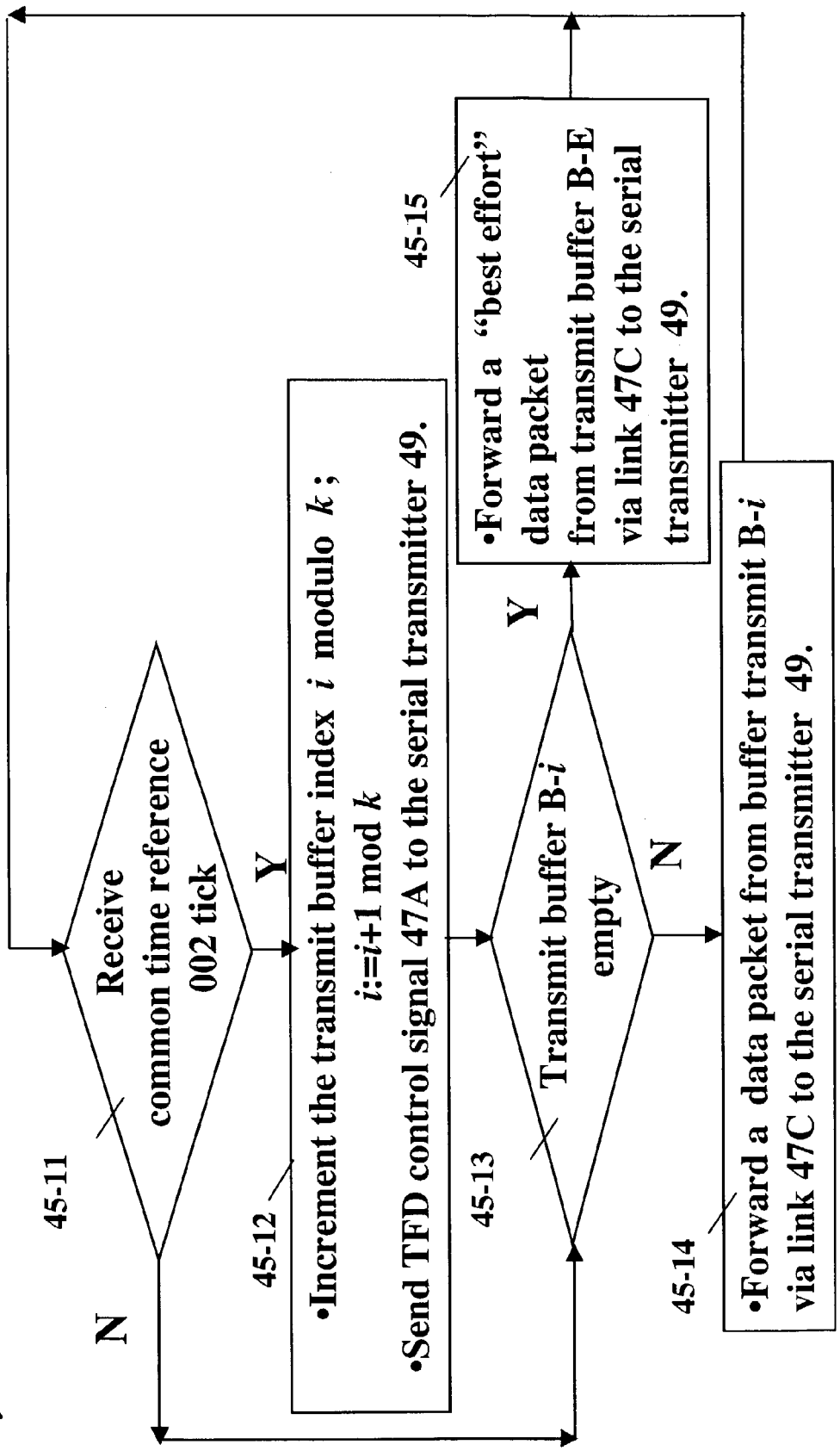
FIG. 12 is a flow diagram illustrating the operation of the select buffer and early random discard (RED) controller 45D.

FIG. 12 depicts a possible program executed by the select buffer and time-driven random early discard controller 45D. As specified in 45-11, at the beginning of a new time frame a time frame delimiter control signal is sent to the serial transmitter 49 through control line 47A, as specified in 45-12. Moreover, the next transmit buffer 45C is considered, as specified in 45-12. As specified by 45-13 and 45-14, a data packet is retrieved from the current one of the transmit buffers 45C B-i and sent to the serial transmitter 49 through data line 47C. As specified by 45-13 and 45-15, once the current one of the transmit buffers 45C has become empty, data packets are retrieved from buffer B-E for transmission to the serial transmitter 49 through data line 47C.

When a data packet in which the priority bits 35P, P1/P2, are "01" (i.e., time-driven best effort), remains in its respective transmit buffer 45C after the end of the corresponding time frame, the select buffer and time-driven random early discard controller 45D is responsible for taking a discard decision, i.e., to either reschedule the data packet—by sending it back to the Best Effort Scheduling Controller 45A and the rescheduling controller 45RC through line 45R—or to discard it, thus implementing time-driven RED.

In a possible embodiment, the discard decision is taken by comparing the current UTC time with the TOA 35T associated to the packet. Is such difference is larger than a predefined maximum forwarding time, the packet is discarded, otherwise it is rescheduled. In a possible embodiment, the predefined value is a parameter configured on the switch. In another possible embodiment the predefined maximum forwarding time is a parameter depending on the PID 35C of the data packet.

In another possible embodiment, the discard decision is taken by comparing the current UTC time with the time-stamp 35TS associated to the packet. Is such difference is larger than a predefined maximum forwarding time, the packet is discarded, otherwise it is rescheduled. In a possible embodiment, the predefined value is a parameter configured on the switch. In another possible embodiment the predefined maximum forwarding time is a parameter depending on the PID 35C of the data packet.

In a possible embodiment the discard decision is taken randomly. In a possible embodiment, the discard decision is based on a combination of at least two of the previously described decision methods.

In a possible embodiment incoming data packets in which their priority bits 35P, P1/P2, are "01" (i.e., time-driven best effort) are switched by the Best Effort Scheduling Controller 45A and the rescheduling controller 45RC to the transmit "best effort" buffer B-E via link 45-be. Before transmitting on line 47C a data packet with priority bits 35P "01" retrieved from the best effort buffer B-E, the select buffer and time-driven random early discard controller 45D checks whether the packet should be discarded according to one of the time-driven RED operation possible implementations described above.

In a possible implementation the select buffer and time-driven random early discard controller 45D comprises an explicit congestion notification (ECN) controller 45ECN responsible for detecting a congestion state within the switch and generate a temporal explicit congestion notification (ECN) signal 47ECN to other network entities. According to alternative operation modes, the temporal explicit congestion notification (ECN) signal 47ECN can be sent to at least one of the sending end-system, the receiving end-system, a downstream (between the generating switch and the receiver) intermediate system, and an upstream (between the generating switch and the sender) intermediate system. According to alternative embodiments the temporal explicit congestion notification (ECN) signal 47ECN can be included in data packets traveling towards the sender and the receiver, or can be implemented through a dedicated packet traveling towards the intended destination of the temporal explicit congestion notification (ECN) signal 47ECN. Possible deployments of the temporal explicit congestion notification (ECN) signal 47ECN will be presented later in this disclosure.

Window Flow Control with Common Time Reference

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Figure 14:
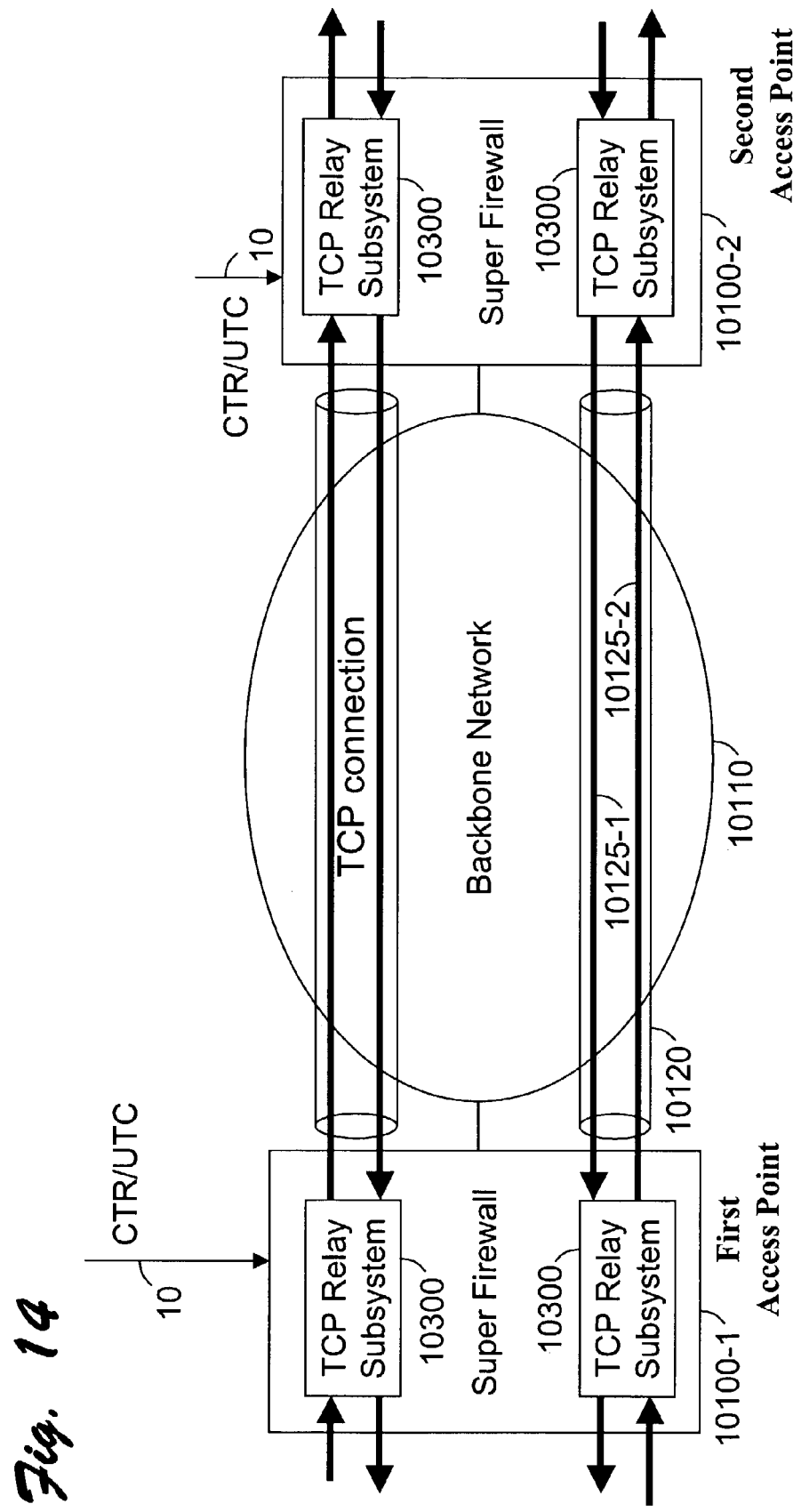
FIG. 14 is a system for controlling the transmission of data packets between a first access point and a second access point on each end of a network, coupled to a common time reference (CTR)

The present invention relates to a system and method for controlling the transmission of data packets between a first access point 10100-1 and a second access point 10100-2 on each end of a network 10110, coupled to a common time reference (CTR) 10, as shown in FIG. 14. In a possible embodiment, the CTR 10 is devised from the Coordinated Universal Time (UTC). In a possible embodiment, the access point 10100 is a firewall or, as it is called in FIG. 14, a Super Firewall given its enhanced functionality with respect to traditional firewalls. In a possible embodiment the network 10110 through which the access points 10100 are coupled is a backbone network.

The two access points 10100 establish a connection 10120 between themselves for exchange of data packets. In a possible embodiment the network 10110 between the access points 10100 is a packet network and the connection 10120 is a virtual connection. In the embodiment shown in FIG. 14 the connection 10120 is a bidirectional TCP (transmission control protocol) virtual connection with a data packet flow 10125-2 from the first access point 10100-1 to the second access point 10100-2, and a data packet flow 10125-1 in the opposite direction.

In the embodiment depicted in FIG. 14, each Super Firewall 10100 contains at least one instance of a TCP Relay Subsystem 10300 that terminates a TCP connection 10120 with the other Super Firewall 10100. The Super Firewall 10100 is also coupled to a plurality of end stations 10200 through a second network 10210 that, as shown in FIG. 15A, can be an access network. In the preferred embodiment the access network 10210 has known and predictable performance in terms of delay, which is possibly short. For example, the access network 10210 is at least one of a local area network (LAN), an enterprise campus network, or a high speed metropolitan area network (MAN).

The access point 10100 establishes at least one connection 10220 with an end station 10200 for exchange of data packets. In a possible embodiment the network 10210 coupling the access point 10100 and the end station 10200 is a packet network and the connection 10220 is a virtual connection. In the embodiment shown in FIG. 15A the connection 10220 is a bidirectional TCP (transmission control protocol) virtual connection with a data packet flow 10125-2 from the access point 10100 to the end station 10200, and a data packet flow 10125-1 in the opposite direction.

In the preferred embodiment the connection 10210 in FIG. 15A differs from the connection 10110 in FIG. 14 in that the transmission of data packets in the former 10110 is controlled according to the method disclosed in this invention, while the transmission of data packets in the latter 10210 is controlled according to traditional methods such as, for example, methods specified for TCP connections.

This disclosure presents a method for controlling the transmission of data packets in a system between a first access point 10100-1 and a second access point 10100-2 on each end of a network 10110, coupled to a UTC (Universal Coordinated Time) signal, the method comprising receiving and storing incoming data packets to be transmitted from the first access point, assigning a packet time-stamp based on the then current UTC, associating the packet time-stamp with the data packets to be transmitted, transmitting the data packets to the second access point 10100-2, receiving and storing the data packets at the second access point, computing a target packet arrival time 10550 (FIG. 18) responsive to the packet time-stamp 10500 for the respective data packet, scheduling forwarding of the respective data packet responsive to the UTC signal and the target packet arrival time, and scheduling receiver acknowledgement processing to generate an acknowledgement signal back to the first access point responsive to the UTC signal and the target packet arrival time 10550.

The transmission control method further comprises assigning and attaching an acknowledgement time-stamp 10530 (FIG. 18B) to the acknowledgment signal, responsive to the UTC signal, and sending the acknowledgement signal to the first access point 10100-1 (FIG. 14). Moreover, the transmission control method herein disclosed further assigns a first window-size, defines a first number of data packets to be transmitted within a defined time period, receives and stores the acknowledgement signal, computes a target acknowledgement arrival time responsive to the acknowledgement time-stamp and to the UTC signal, and adaptively redefines the window-size responsive to the UTC signal and the target acknowledgment arrival time.

In a possible embodiment, the transmission control method assigns a packet-bound, defines an expected time delay between transmission from the first access point until the receiving acknowledgement processing, and adapts the packet delay-bound, responsive to the UTC signal and the packet time-stamp. The disclosed method further assigns an acknowledgement arrival time to the acknowledgement signal as it is received and adaptively redefines the target acknowledgement arrival time responsive to the UTC signal, the time-stamp and the acknowledgement arrival time. Moreover, the disclosed method assigns an acknowledgment delay-bound, defining and expected time delay between the sending of the acknowledgement signal until adaptively redefining the window-size and adapts the acknowledgment delay-bound responsive to the UTC signal and the acknowledgement time-stamp.

Figure 16:
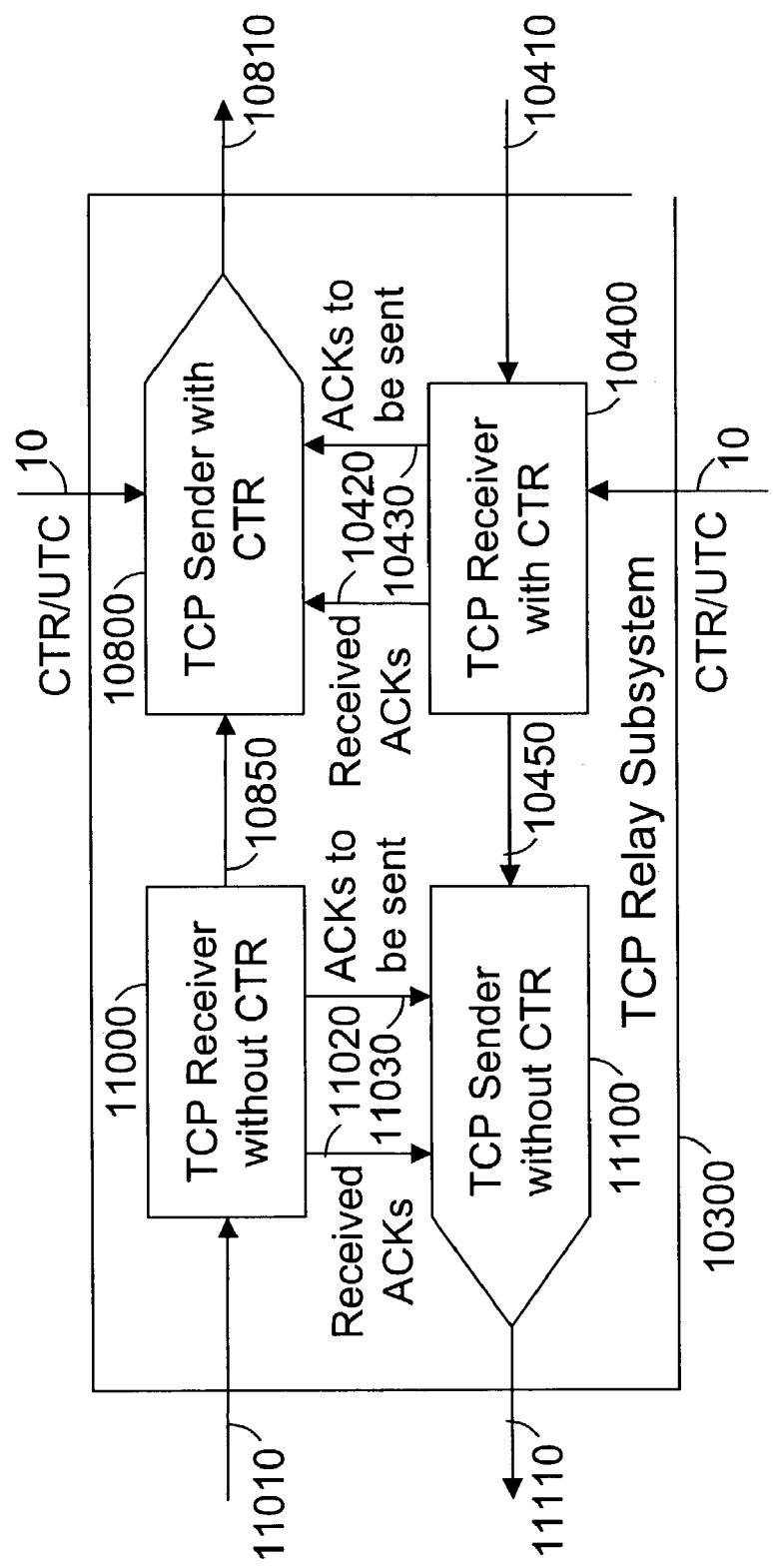
FIG. 16 is the architecture of a TCP Relay Subsystem forwarding data packets from input data lines to output data lines responsive to the CTR, time-stamps included in the data packets, and acknowledgement signals included in the flow of data packets.

FIG. 16 shows a possible embodiment of the TCP Relay Subsystem 10300 encompassing a TCP Sender with CTR Subsystem 10800, a TCP Receiver with CTR Subsystem 10400, a TCP Sender without CTR Subsystem 11100, and a TCP Receiver without CTR Subsystem 11000.

TCP Sender with CTR Subsystem 10800 generates on its output data line 10810 a data packet flow 10125 on a connection 10120 with another Super Firewall 10100 participating in the realization of the data packet transmission control method disclosed in this invention. The TCP receiver with CTR Subsystem 10400 receives on its input data line 10410 a data packet flow 10125 on a connection 10120 from another Super Firewall 10100 participating in the realization of the data packet transmission control method disclosed in this invention.

TCP Sender without CTR Subsystem 11100 generates on its output data line 11110 a data packet flow 10125 on a connection 10220 with an end station 10200 implementing at least one of the data packet transmission control method known in the literature and commonly deployed over packet networks. The TCP Receiver without CTR Subsystem 11000 receives on its input data line 11010 a data packet flow 10125 on a connection 10120 from an end station 10200 implementing at least one of the data packet transmission control method known in the literature and commonly deployed over packet networks.

The TCP Receiver with CTR Subsystem 10400, responsive to the CTR 10, to the data packets received over its input data line 10410, and to time stamps included in the data packets received over its input data line 10410, generates a Received ACK control signal 10420 and an ACK to be sent control signal 10430 to its respective TCP Sender with CTR Subsystem 10800. Moreover, the TCP receiver with CTR Subsystem 10400 forwards data packets received through its input data line 10410 to its respective TCP Sender without CTR Subsystem 11100 through its output data line 10450, responsive to the CTR 10 and to time stamps included in the data packets received over its input data line 10410.

The TCP Sender with CTR Subsystem 10800, responsive to the CTR 10 and to the Received ACK control signal 10420 and the ACK to be sent control signal 10430 received from its respective TCP Receiver with CTR Subsystem 10400, forwards on its output data line 10810 data packets received from its input data line 10850 from its respective TCP Receiver without CTR Subsystem 11000. In a possible embodiment, the TCP Sender with CTR Subsystem 10400 generates data packets for transmission through its output data line 10810 that are compliant with the TCP and controls transmission of data packets on its output data line 10810 through a window that is handled according to the method disclosed in this invention.

The data packets generated by the TCP Sender with CTR Subsystem 10800 on its output data line 10810 constitute a data packet flow 10125 (see FIG. 14) that is coupled with a remote Super Firewall 10100 in a way that the corresponding data units are received by a respective TCP Receiver with CTR Subsystem 10400 through its input data line 10410. The data packets received by the TCP Receiver with CTR Subsystem 10400 on its input data line 10410 constitute a data packet flow 10125 (see FIG. 14) that is coupled with a remote Super Firewall 10100 in a way that the corresponding data units are generated by a respective TCP Sender with CTR Subsystem 10800 through its output data line 10810.

The TCP Receiver without CTR Subsystem 11000, responsive to the data packets received over its input data line 11010, generates a Received ACK control signal 11020 and an ACK to be sent control signal 11030 to its respective TCP Sender without CTR Subsystem 11100. Moreover, the TCP receiver without CTR Subsystem 11000 forwards data packets received through its input data line 11010 to its respective TCP Sender with CTR Subsystem 10800 through its output data line 10850.

The TCP Sender without CTR Subsystem 11100, to the Received ACK control signal 11020 and the ACK to be sent control signal 11030 received from its respective TCP Receiver without CTR Subsystem 11000, forwards on its output data line 11110 data packets received from its input data line 10850 from its respective TCP Receiver with CTR Subsystem 10400. In a possible embodiment, the TCP Sender without CTR Subsystem 11100 generates data packets for transmission through its output data line 11110 that are compliant with the TCP and controls transmission of data packets on its output data line 11110 through a window that is handled according to the methods usually deployed for TCP connections.

As shown in FIG. 15B an end station 10200 comprises at least one instance of TCP Sender without CTR Subsystem 11100 and at least one instance of TCP receiver without CTR Subsystem 11000 operating as described above.

As shown in FIG. 15A, the data packets generated on its output data line 11110 by the TCP Sender without CTR Subsystem 11100 within an end system 10200 (see FIG. 15B) constitute a data packet flow 10125 (see FIG. 15A) that is coupled with the TCP Relay Subsystem 10300 of a remote Super Firewall 10100 in a way that the corresponding data units are received by a respective TCP Receiver without CTR Subsystem 11000 through its input data line 11010 shown in FIG. 16. The data packets received on its input data line 11010 by the TCP Receiver without CTR Subsystem 11000 within an end system 10200 (see FIG. 15B) constitute a data packet flow 10125 (see FIG. 15A) that is coupled with the TCP Relay Subsystem 10300 of a remote Super Firewall 10100 in a way that the corresponding data units are generated by a respective TCP Sender without CTR Subsystem 11100 through its output data line 11110 shown in FIG. 16.

As shown in FIG. 15A, the data packets generated on its output data line 11110 by the TCP Sender without CTR Subsystem 11100 within a TCP Relay Subsystem 10300 of a Super Firewall 10100 (see FIG. 16) constitute a data packet flow 10125 (see FIG. 15A) that is coupled with a remote end system 10200 in a way that the corresponding data units are received by a respective TCP Receiver without CTR Subsystem 11000 through its input data line 11010 shown in FIG. 15B. The data packets received on its input data line 11010 by the TCP Receiver without CTR Subsystem 11000 within a TCP Relay Subsystem 10300 of a Super Firewall 10100 (see FIG. 16) constitute a data packet flow 10125 (see FIG. 15A) that is coupled with a remote end system 10200 in a way that the corresponding data units are generated by a respective TCP Sender without CTR Subsystem 11100 through its output data line 11110 shown in FIG. 15B.

Figure 17:
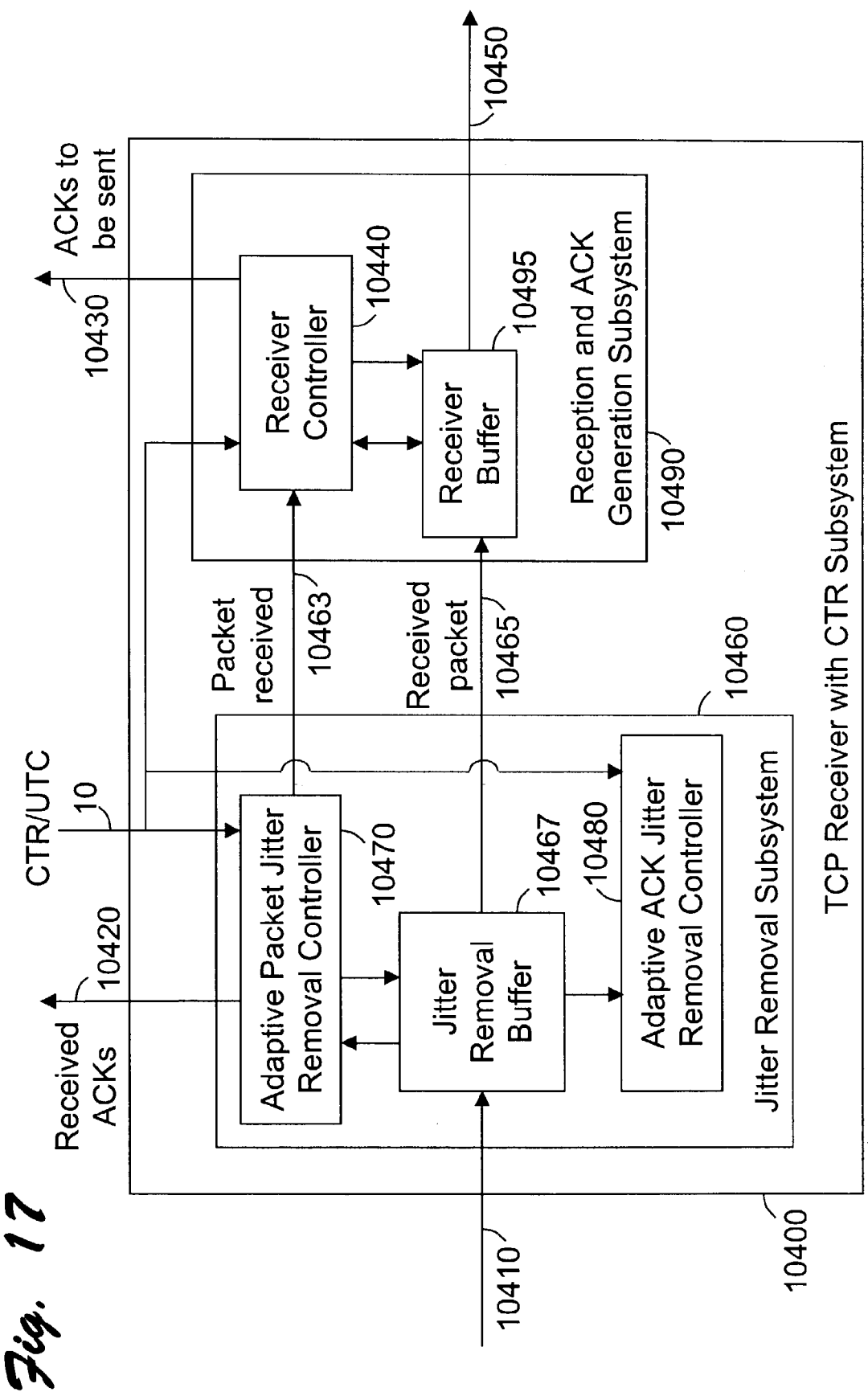
FIG. 17 is the architecture of a TCP Receiver with CTR Subsystem responsible for receiving data packets from an input data line, forwarding them on an output data line, notifying of received acknowledgement signals, and generating acknowledgement signals responsive to the CTR, time-stamps included in the data packets, and acknowledgement signals included in the flow of data packets, wherein the TCP Receiver with CTR Subsystem comprises a Jitter Removal Subsystem and a Reception and ACK Generation Subsystem, the former further comprising an Adaptive Packet Jitter Removal Controller and an Adaptive ACK Jitter Removal Controller, the latter further comprising a Receiver Controller.
Figures 18, 18A, 18B, 18C:
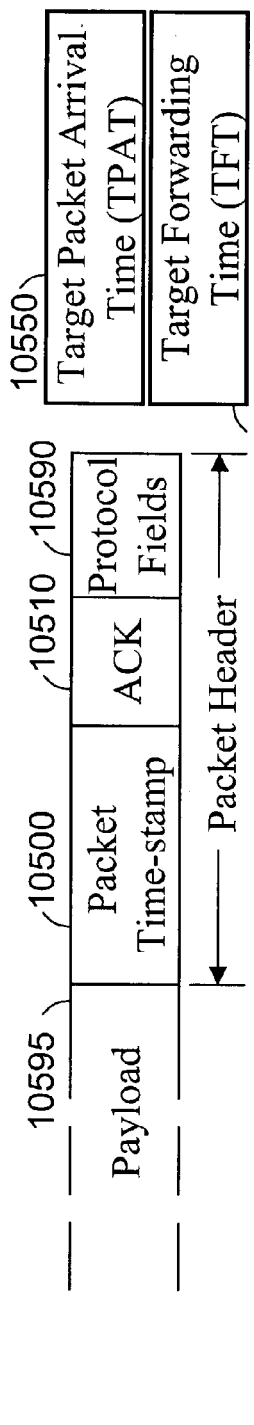
FIG. 18A is the format of a data packet including acknowledgement information (ACK) and a Packet Time-stamp and a Time Of Arrival (TOA), a Target Packet Arrival Time (TPAT), and a Target Forwarding Time (TFT) associated to the packet.
FIG. 18B is the format of a data packet including acknowledgement information (ACK), a Packet Time-stamp, and an Acknowledgement Time-stamp and a Time Of Arrival (TOA), a Target Packet Arrival Time (TPAT), and a Target Forwarding Time (TFT) associated to the packet.
FIG. 18C is the format of a data packet including acknowledgement information (ACK), a Packet Time-stamp, and an Explicit congestion notification and a Time Of Arrival (TOA), a Target Packet Arrival Time (TPAT), and a Target Forwarding Time (TFT) associated to the packet.

FIG. 17 shows the architecture of a possible embodiment of TCP Receiver with CTR Subsystem 10400 comprising a Jitter Removal Subsystem 10460 and a Reception and ACK Generation Subsystem 10490. The Jitter Removal Subsystem 10460 receives data packets on input data line 10410 and stores them into a Jitter Removal Buffer 10467 before forwarding them to the Reception and ACK Generation Subsystem 10490 on data line 10465. In a possible embodiment of Jitter Removal Subsystem 10460 the time from when the packet was sent by the respective TCP Sender with CTR Subsystem 10800 until when the packet is forwarded on data line 10465 is a predefined time called packet delay bound (PB). The Jitter Removal Subsystem 10460 comprises an Adaptive Packet Jitter Removal Controller 10470 that is responsible for scheduling the forwarding time for each packet stored in the Jitter Removal Buffer 10467 responsive to at least one of the CTR 10, to a time stamp 10500 carried by the data packet as shown in FIG. 18A, to other information contained in the packet, including its Protocol Fields 10590 and Payload field 10595, and to the packet delay bound. The packet time-stamp 10500 in FIG. 18, the acknowledgement time-stamp 10530 in FIG. 18B, and the explicit congestion indication 10540 in FIG. 18C are carried in at least one of, but not limited to, a TCP message option, an IP packet option, some of the fields dedicated to carry fragmentation information within an IP header when the corresponding IP packet is not a fragment, a field comprised in a proprietary extension of an IP header, a field comprised in a proprietary extension of a TCP header, a field comprised in a proprietary extension of an Ethernet/IEEE 802.3 header.

Figure 19:
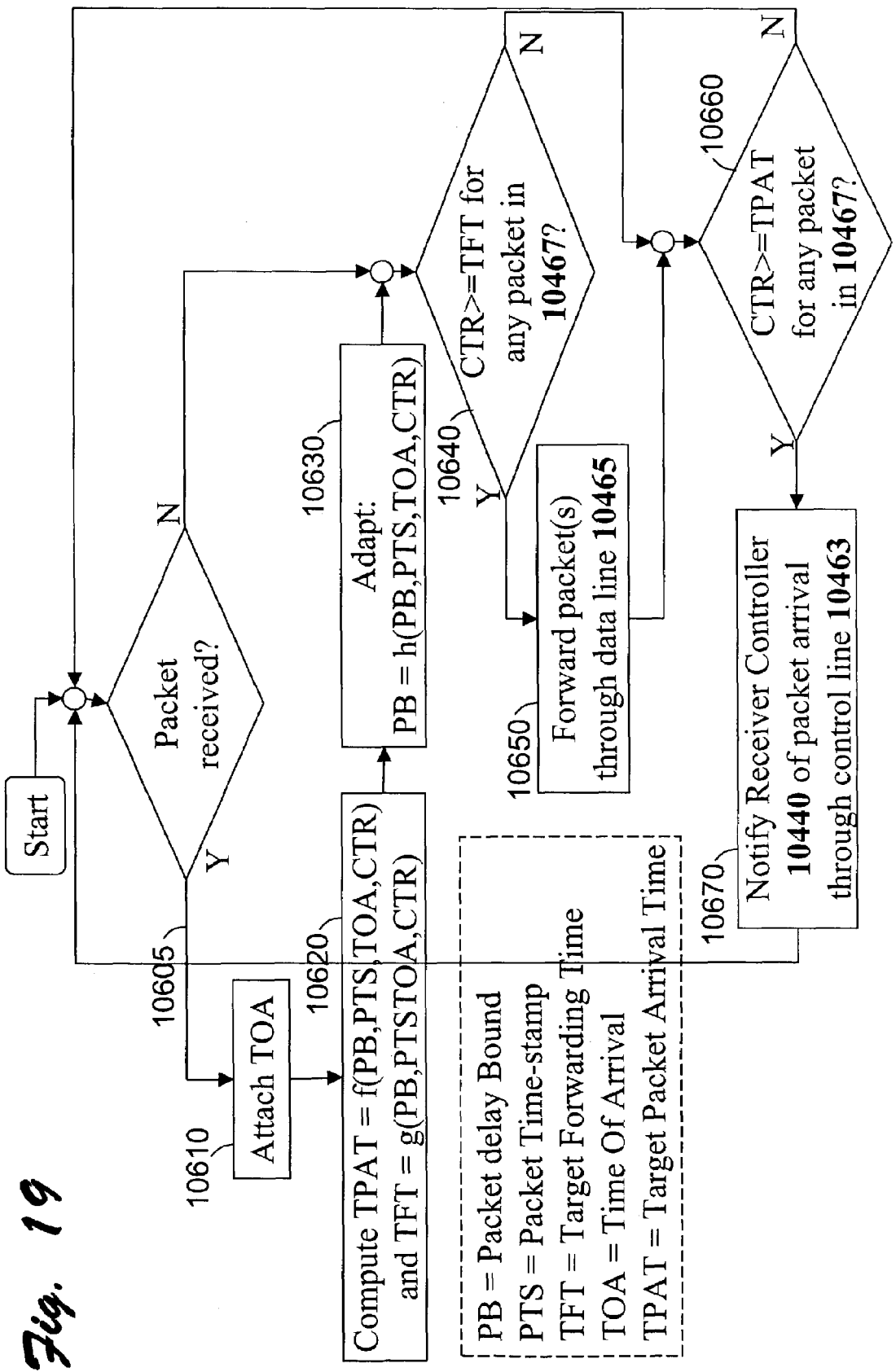
FIG. 19 is a flow chart describing the operation of a possible embodiment of the Adaptive Packet Jitter Removal Controller.

In a possible embodiment, the operation of Adaptive Packet Jitter Removal Controller 10470 upon arrival of a data packet are described by the flow chart in FIG. 19. Whenever a data packet is received 10605 and stored in the Jitter Removal Buffer 10467 in FIG. 17, the Adaptive Packet Jitter Removal Controller 10470 computes the Time of Arrival (TOA) 10610, as shown in FIG. 19, and associates it 10520 to the received data packet, as shown in FIG. 18. Then, as shown in FIG. 19, the Adaptive Packet Jitter Removal Controller 10470 computes 10620 a target packet arrival time (TPAT) 10550 and, as shown in FIG. 18A, FIG. 18B, and FIG. 18C, associates it to the received data packet. In a possible embodiment, the TPAT 10550 is the time at which the packet would have arrived at the Super Firewall 10100 had it traveled through the network 10110 (see FIG. 14) with a delay equal to the packet delay bound. In general, the TPAT 10550 is calculated responsive to at least one of the packet delay bound (PB), the packet time stamp (PTS) 10500, the current value of the CTR 10, and the packet's TOA 10520, as shown in action 10620 of FIG. 19 by function f(PB,PTS,TOA,CTR). The packet arrival event is processed at time TPAT. In the preferred embodiment, at time TPAT the Adaptive Packet Jitter Removal Controller 10470 notifies the Receiver Controller 10440 of the data packet arrival through control line 10463 so that the Receiver Controller 10440 starts processing the event, e.g., evaluating whether an acknowledgement is to be sent.

As shown in action 10620 of FIG. 19, the Adaptive Packet Jitter Removal Controller 10470 also computes the Target Forwarding Time (TFT) 10560 and, as shown in FIG. 18A, FIG. 18B, and FIG. 18C, associates it to the received data packet. In a possible embodiment, the TFT 10560 is the time at which the packet would have arrived to the Super Firewall 10100 had it traveled through the network 10110 (see FIG. 14) with a delay equal to the packet delay bound. In another embodiment, the TFT is zero in order to minimize the time the data packet takes to reach its final destination. In general, the TFT 10560 is calculated responsive to the packet delay bound (PB), the packet time stamp (PTS) 10500, the current value of the CTR 10, and the packet's TOA 10520, as shown in action 10620 of FIG. 19 by function g(PB,PTS,TOA,CTR).

In order to adapt to changing network conditions in terms of load and congestion—hence of delay experienced by data packets traveling through the network 10110 (see FIG. 14)—the Adaptive Packet Jitter Removal Controller 10470 may change the value of PB, as shown by action 10630 of FIG. 19. In a possible embodiment, the Adaptive Packet Jitter Removal Controller 10470 has the objective of minimizing both the TPAT 10550 and TFT 10560. In general, the Adaptive Packet Jitter Removal Controller 10470 changes PB responsive to the packet delay bound (PB), the packet time stamp (PTS) 10500, the current value of the CTR 10, and the packet's TOA 10520, as shown in action 10630 of FIG. 19 by function h(PB,PTS,TOA,CTR).

Step 10630 in FIG. 19 ends the processing of a data packet arrival by the Adaptive Packet Jitter Removal Controller 10470 that now checks whether the time for forwarding any packet in the Jitter Removal Buffer 10467 has come. This is checked by comparing 10640 the TFT 10560 of each packet in the Jitter Removal Buffer 10467 with the CTR 10; packets whose TFT 10560 is less then or equal to the current CTR value are forwarded through data line 10465 to the Reception and ACK Generation Subsystem 10490, as shown by action 10650 in FIG. 19. In a possible embodiment the Adaptive Packet Jitter Removal Controller 10470 stores packets in the Jitter Removal Buffer 10467 according to a data structure that enables finding packets whose TFT 10560 is less then or equal to the current CTR value with minimum time, processing power, and accesses to the Jitter Removal Buffer 10467.

Next, the Adaptive Packet Jitter Removal Controller 10470 checks whether the time for notifying the Reception and ACK Generation Subsystem 10490 has come. This is checked by comparing 10660 the TPAT 10550 of each packet in the Jitter Removal Buffer 10467 with the CTR 10; the Reception and ACK Generation Subsystem 10490 is notified through control line 10463 of each packet whose TPAT 10560 is less then or equal to the current CTR value, as shown in action 10670 of FIG. 19. In a possible embodiment the Adaptive Packet Jitter Removal Controller 10470 stores packets in the Jitter Removal Buffer 10467 according to a data structure that enables finding packets whose TPAT 10550 is less then or equal to the current CTR value with minimum time, processing power, and accesses to the Jitter Removal Buffer 10467. In a possible embodiment, a packet is not removed from the Jitter Removal Buffer 10467 until both action 10650 and action 10670 have been performed. In another embodiment, after action 10650 has been performed the forwarded data packet is removed from the Jitter Removal Buffer 10467 and only the packet parts, such as at least one of (see FIG. 18A, FIG. 18B, and FIG. 18C) Protocol Fields 10590, Payload 10595, Packet Time-stamp 10500, ACK field 10510, Acknowledgement Time-stamp 10530, Explicit Congestion Indication 10540, necessary for properly notifying 10670 the Reception and ACK Generation Subsystem 10490 at TPAT 10550 are retained in the Jitter Removal Buffer 10467.

The TCP Receiver with CTR Subsystem 10400 architecture depicted in FIG. 17 comprises a Reception and ACK Generation Subsystem 10490 further comprising a Receiver Controller 10440 and a Receiver Buffer 10495. Data packets received on data line 10465 are stored in the Receiver Buffer 10495. The Receiver Controller 10440 determines when each data packet, or part thereof, stored in the Receiver Buffer 10495 should be transferred through data line 10450 out of the TCP Receiver with CTR Subsystem 10400, i.e., be received by the final destination.

In a possible embodiment, the Receiver Controller 10440 operates according to the principles specified for TCP receivers for controlling the flow of data packets, detecting missing data packets, misinserted data packets, misordered data packets, and generating an acknowledgement (ACK) signal on control line 10430 that is to be send back to the sender of the data packets. The Receiver Controller operates responsive to data packets stored in the Receiver Buffer 10495, to the packet received notification received from the Jitter Removal Subsystem 10460 on control line 10465, and to the CTR signal 10.

In a possible embodiment, the Receiver Controller 10440 generates an ACK signal on control line 10430 according to the various options for generating ACK signals provided by TCP, including acknowledging the reception of each packet, sending multiple ACKs for the same packet when following packets are missing, generating a cumulative ACK for a plurality of packets (delayed acknowledgement), and selectively acknowledging packets that are received while (possibly implicitly) notifying of missing packets.

In a possible embodiment the ACK signal encompasses at least one of a plurality of parameters including an identifier of the packet it refers to, such as a packet sequence number, and an acknowledgement time-stamp, i.e., the Packet Time-stamp 10500 associated with the packet the ACK signal refers to.

As shown in FIG. 16, control line 10430 is connected to the respective TCP Sender with CTR Subsystem 10800 handling the connection's packet flow in the opposite direction so that it can include the ACK signal and its parameters in the packet flow in the opposite direction so that the ACK signal can reach the sender.

The Jitter Removal Subsystem 10460 included in the embodiment of TCP Receiver with CTR Subsystem 10400 shown in FIG. 17 comprises an Adaptive ACK Jitter Removal Controller 10480 that is responsible for scheduling the time at which its corresponding TCP Sender with CTR Subsystem 10800 is notified through control line Received ACKs 10420 of the reception of an acknowledgement (ACK) signal within the flow of data packets arriving on input data line 10410.

ACK signals are carried by data packets as ACK information 10510, as shown in FIG. 18A, FIG. 18B, and FIG. 18C. A data packet carrying the ACK information 10510 may carry also data in its Payload field 10595 (this mode of operation is commonly called acknowledgement piggybacking). A packet may carry the ACK information 10510 and no data in its Payload field 10595, in which case the packet can be said an acknowledgement packet.

The Adaptive ACK Jitter Removal Controller 10480 schedules the time at which its corresponding TCP Sender with CTR Subsystem 10800 is notified through control line Received ACKs 10420 of the reception of an acknowledgement (ACK) signal responsive to at least one of the CTR 10, to a time stamp 10500 carried by the data packet as shown in FIG. 18A, the acknowledgement time-stamp 10530 carried within the packet, as shown in FIG. 18B, other information contained in the packet, including its Protocol Fields 10590 and Payload field 10595, and an acknowledgement delay bound (AB).

Figure 20:
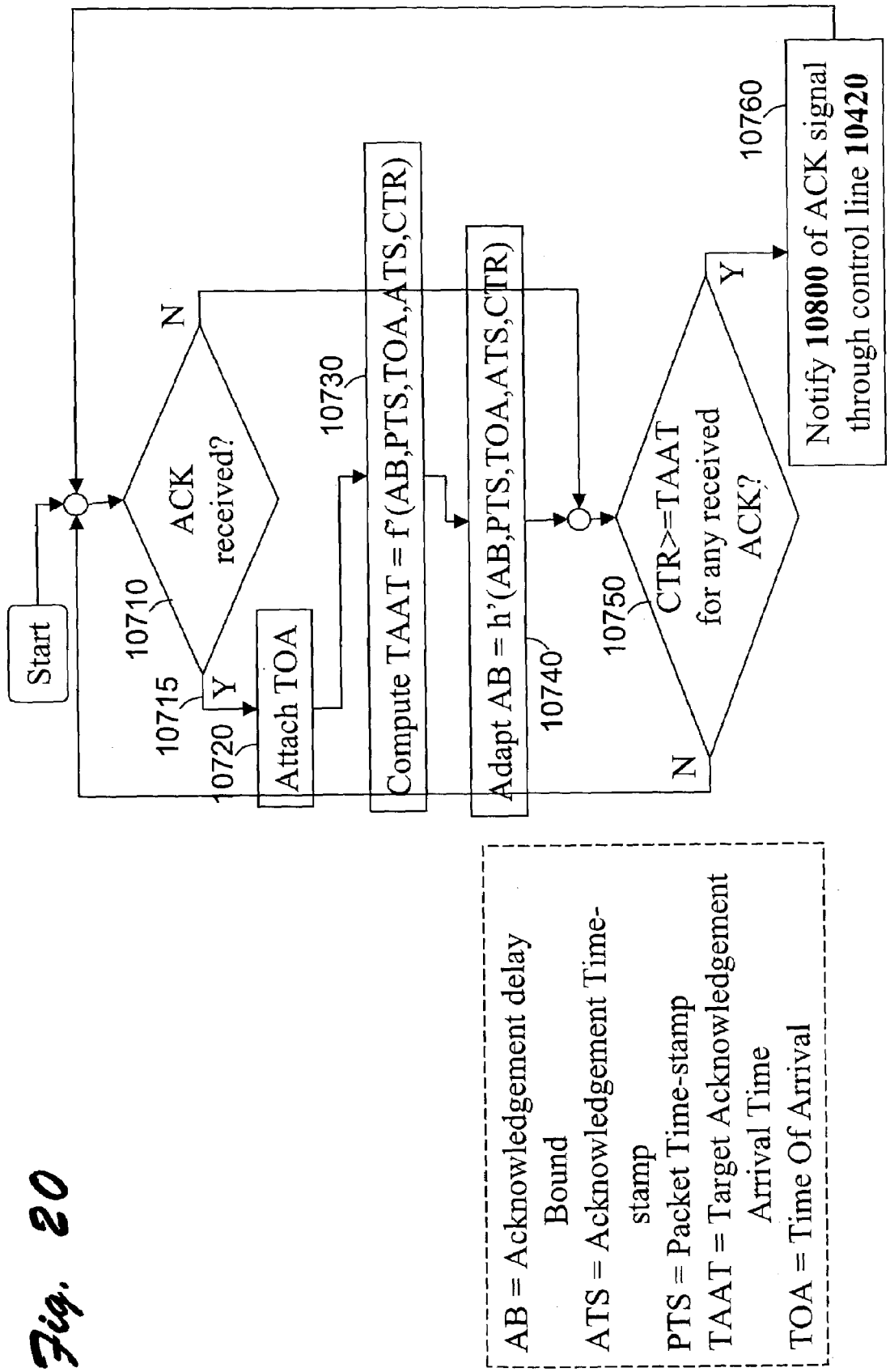
FIG. 20 is a flow chart describing the operation of a possible embodiment of the Adaptive ACK Jitter Removal Controller.

In a possible embodiment, the operation of Adaptive ACK Jitter Removal Controller 10480 upon arrival of a packet carrying ACK information 10510 are described by the flow chart in FIG. 20. Whenever an ACK is received 10715, the Adaptive ACK Jitter Removal Controller 10480 attaches to the received ACK 10720 the Time of Arrival (TOA) 10520 computed and associated 10610 to the corresponding packet, as shown in FIG. 18A, as explained earlier in this disclosure (see FIG. 19). Then, as shown in FIG. 20, the Adaptive ACK Jitter Removal Controller 10480 computes 10730 a target ACK arrival time (TAAT) and the received ACK signal. In a possible embodiment, the TAAT is the time at which the packet would have arrived at the Super Firewall 10100 had it traveled through the network 10110 (see FIG. 14) with a delay equal to the ACK delay bound (AB). In general, the TAAT is calculated responsive to at least one of the ACK delay bound (AB), the packet time stamp (PTS) 10500, the attached TOA 10520, the current value of the CTR 10, and the Acknowledgement Time-stamp 10530 (see FIG. 18B), as shown in action 10730 of FIG. 20 by function f'(AB,PTS, TOA,ATS,CTR). The ACK arrival event will be processed at time TAAT. In the preferred embodiment, at time TAAT the Adaptive ACK Jitter Removal Controller 10480 notifies its corresponding TCP Sender with CTR 10800 of the ACK arrival through control line 10420 so that the corresponding TCP Sender with CTR 10800 starts processing the ACK signal, which includes adjusting the transmission window.

In order to adapt to changing network conditions in terms of load and congestion—hence of delay experienced by data packets and carried ACK signals traveling through the network 10110 (see FIG. 14)—the Adaptive ACK Jitter Removal Controller 10480 may change the value of AB, as shown by action 10740 of FIG. 20. In a possible embodiment, the Adaptive ACK Jitter Removal Controller 10480 has the objective of minimizing the TAAT and hence the reaction time of the system for controlling packet transmission. In general, the Adaptive ACK Jitter Removal Controller 10480 changes AB responsive to at least one of the ACK delay bound (AB), the packet time stamp (PTS) 10500, the attached TOA 10520, the current value of the CTR 10, and the Acknowledgement Time-stamp 10530 (see FIG. 18B), as shown in action 10740 of FIG. 20 by function h'(AB,PTS, TOA,ATS,CTR).

Step 10740 in FIG. 20 ends the processing of an ACK signal arrival by the Adaptive ACK Jitter Removal Controller 10480 that now checks whether the time for forwarding any ACK signal previously received has come. This is checked by comparing 10750 the TAAT of each received ACK signal with the current value of the CTR 10; ACKs whose TAAT is less then or equal to the current CTR value are forwarded through control line 10420 to the TCP Sender with CTR 10800, as shown by action 10760 in FIG. 20.

In a possible embodiment, a packet carrying ACK information 10510 is stored in the Jitter Removal Buffer 10467 in FIG. 17, as explained before in this disclosure, so that the ACK information 10510 and its parameters are stored together with the packet. The packet will not be removed from the Jitter Removal Buffer 10467 until both action 10650 and action 10670 in FIG. 19, and action 10760 in FIG. 20 have been performed. In a possible embodiment the Adaptive ACK Jitter Removal Controller 10480 stores packets in the Jitter Removal Buffer 10467 according to a data structure that enables finding packets carrying an ACK whose TAAT is less then or equal to the current CTR value with minimum time, processing power, and accesses to the Jitter Removal Buffer 10467. In another embodiment the Adaptive ACK Jitter Removal Controller 10480 stores information related to ACK signal separately from the packets carrying them, i.e., ACK information is not stored in the Jitter Removal Buffer 10467 and packets can be removed from the Jitter Removal Buffer 10467 independently of the operation of the Adaptive ACK Jitter Removal Controller 10480.

Figure 22:
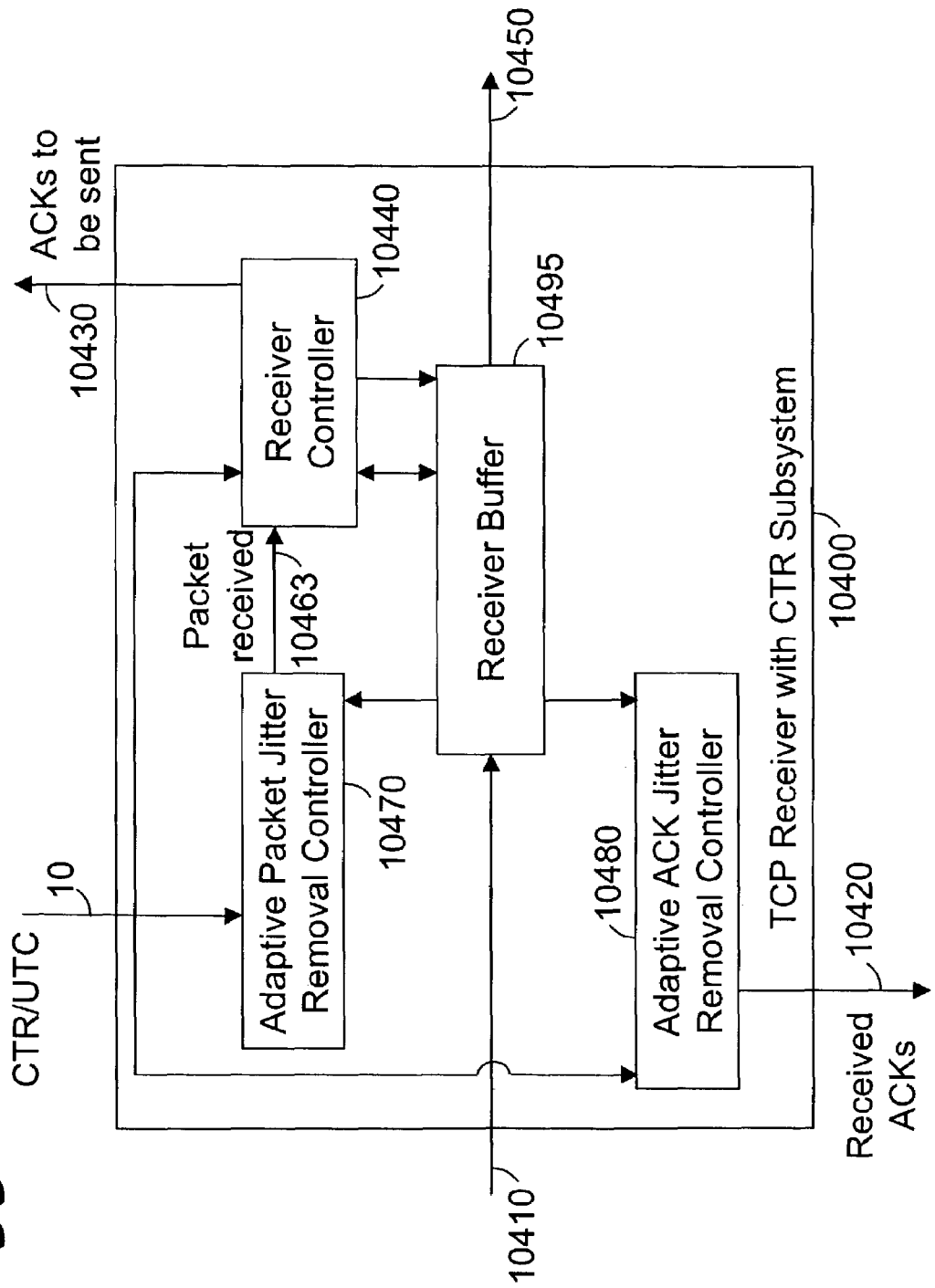
FIG. 22 is the architecture of a TCP Receiver with CTR Subsystem responsible for receiving data packets from an input data line, forwarding them on an output data line, notifying of received acknowledgement signals, and generating acknowledgement signals responsive to the CTR, time-stamps included in the data packets, and acknowledgement signals included in the flow of data packets, wherein the TCP Receiver with CTR Subsystem comprises an Adaptive Packet Jitter Removal Controller, an Adaptive ACK Jitter Removal Controller, and a Receiver Controller.
Figure 23:
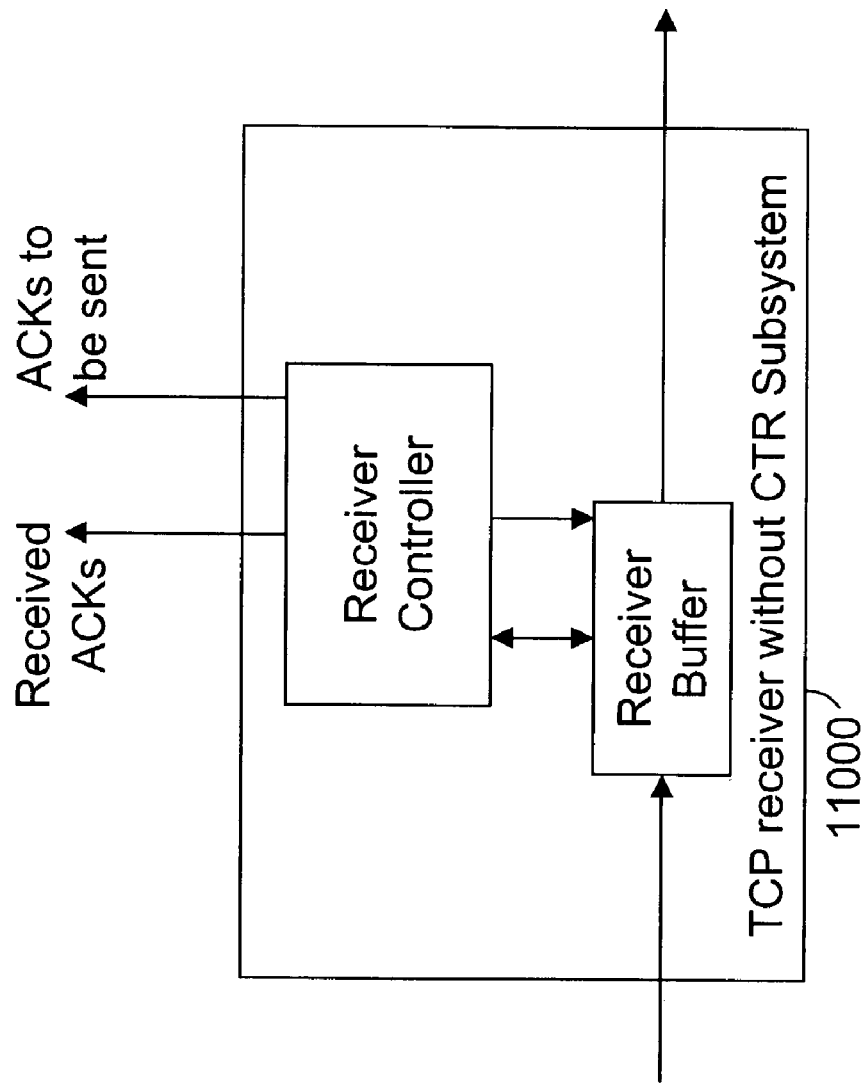
FIG. 23 is the architecture of a TCP Receiver without CTR Subsystem responsible for receiving data packets from an input data line, forwarding them on an output data line, notifying of received acknowledgement signals, and generating acknowledgement signals according to a predefined packet transmission control algorithm, wherein the TCP Receiver without CTR Subsystem comprises a Receiver Controller.
Figure 24:
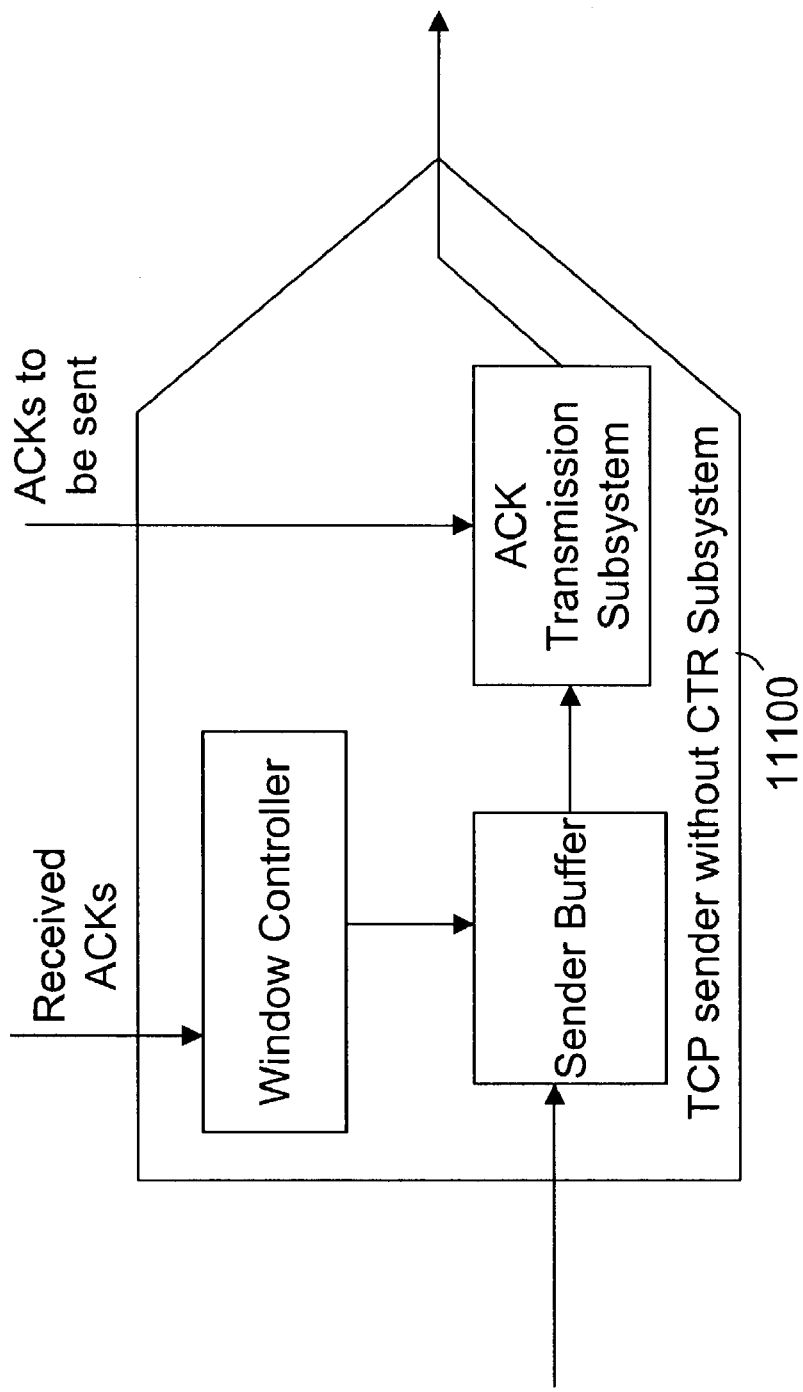
FIG. 24 is the architecture of a TCP Sender without CTR Subsystem responsible for receiving data packets from an input data line, forwarding them on an output data line, and including in the data flow acknowledgement signals responsive to the CTR, and acknowledgement signals notifications and request to send acknowledgment signals through the respective control lines, wherein the TCP Sender without CTR Subsystem comprises a Window Controller and an ACK Transmission Subsystem.

FIG. 22 shows the architecture of a possible embodiment of TCP Receiver with CTR 10400 wherein packets are always stored into the Receiver Buffer 10495 as soon as they are received. In other words, the architecture shown in FIG. 22 implements the behavior the architecture shown in FIG.

17 has when the TFT 10560 is set to the current value of the CTR 10 time. Besides not performing TFT 10560 calculation and not storing packets in a Jitter Removal Buffer 10467 (see FIG. 19), the behavior of the Adaptive Packet Jitter Removal Controller 10470, Adaptive ACK Jitter Removal Controller 10480, and the Receiver Controller 10440 is the same as described above.

Figure 21:
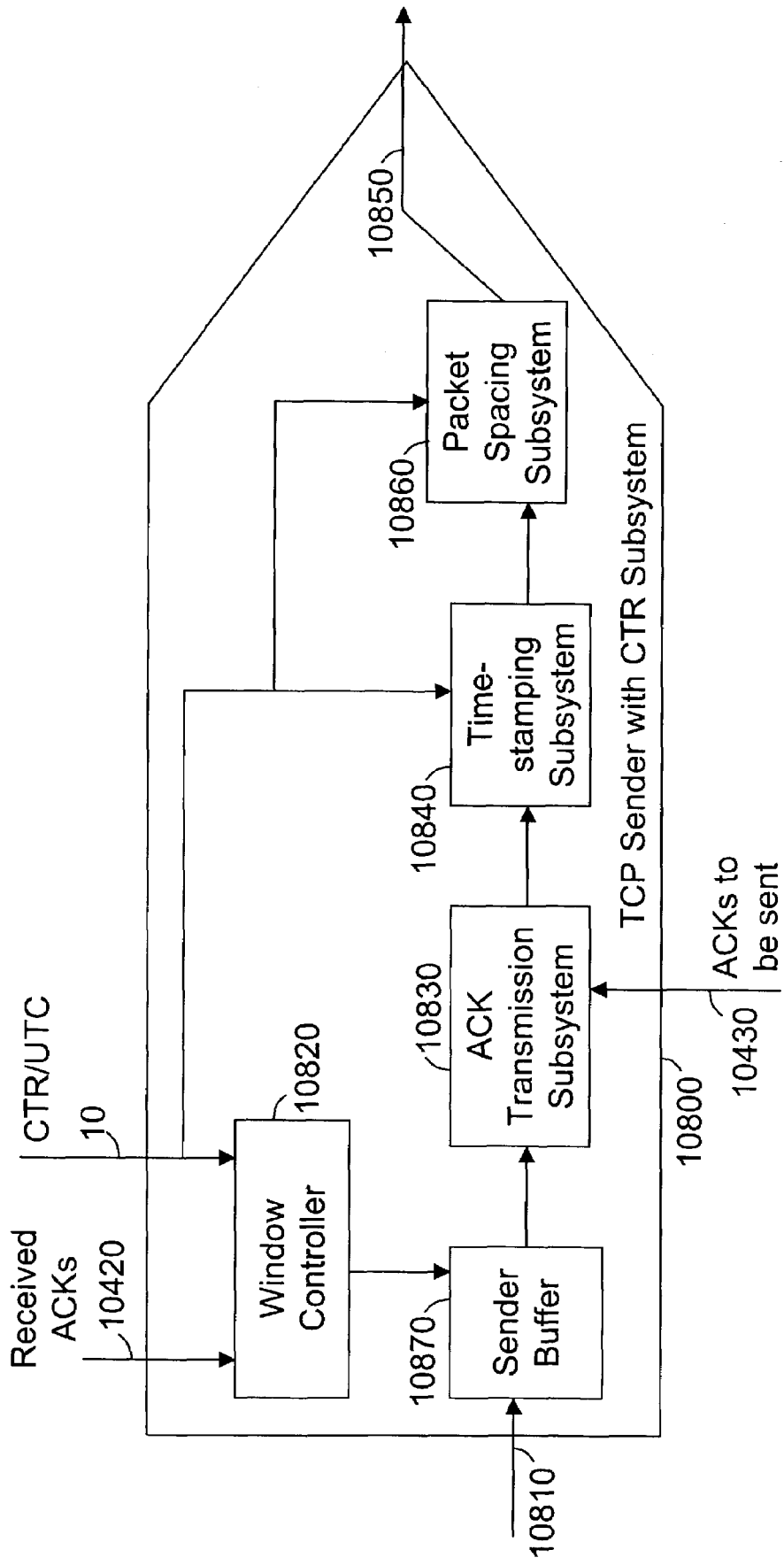
FIG. 21 is the architecture of a TCP Sender with CTR Subsystem responsible for receiving data packets from an input data line, forwarding them on an output data line, and including in the data flow acknowledgement signals responsive to the CTR, and acknowledgement signals notifications and request to send acknowledgment signals through the respective control lines, wherein the TCP Sender with CTR Subsystem comprises a Window Controller, an ACK Transmission Subsystem, a Time-stamping Subsystem, and a Packet Spacing Subsystem.

FIG. 21 is the architecture of a possible embodiment of TCP Sender with CTR Subsystem 10800. The TCP Sender with CTR Subsystem 10800 is comprised of a window controller 10820, a sender buffer 10870, an ACK transmission subsystem 10830, a time-stamping subsystem 10840, and a packet spacing subsystem 10860.

The Window Controller 10820 controls the position and size of the sliding window, which determines the amount of data contained in the sender buffer 18070 that can be sent, responsive to the received ACKs 10420 and to the CTR/UTC 10. In a possible embodiment, the Window Controller 10820 uses the acknowledgement time-stamp 10530 and the TOA 10520 associated with a TCP message as shown in FIG. 18B and the time at which the acknowledged message was sent to measure the forward (PB) and reverse (AB) direction delay experienced by the original message and its corresponding ACK. Information on these delays can be used to infer the congestion state of the network, and the window size could be varied, i.e., increased or decreased, accordingly in order to maximize the performance of the TCP connection.

In a possible embodiment, a small value of the forward delay (PB) is used to infer a low congestion in the forward direction and the sliding window is increased. Thus, the window size in controlled according to the one way delay, rather than the round trip time, as in most commonly used TCP implementations.

The time-stamping subsystem 10840 includes in packets that are sent on a TCP connection a time-stamp 10500, as shown in FIG. 18A, FIG. 18B, and FIG. 18C, with the current value of the CTR/UTC 10. The ACK transmission subsystem 10830 includes in transmitted messages the respective ACK 10510 in FIGS. 18A, 18B, and 18C, generated by the receiver controller 10440 (see FIG. 17) on control line 10430 as previously described.

In an alternative embodiment the time-stamping subsystem 10840 and the packet spacing subsystem 18060 are cascaded in an order different from the one shown in FIG. 21.

In a possible implementation when the window controller 10820 moves the TCP sliding window or increases its size to include unsent data stored in the sender buffer 10870, multiple packets can be sent back to back at the speed of the output link 10850. According to an alternative embodiment, the packet spacing subsystem 10860 can space packets in time by a specified spacing amount. The specified spacing amount can be computed according to at least one of the current UTC time, the transmission time of at least one previously transmitted copy of a packet being retransmitted, at least one of the TOA 10520, the TPAT 10550, the TFT 10560, the packet time-stamp 10500, the acknowledgment time-stamp 10530, and the TAAT associated with the packet carrying the ACK that caused the sliding window to move or to be resized.

The present invention relates to a system and method for controlling the transmission of data packets between a first access point 10100-1 and a second access point 10100-2 on each end of a network 10110, coupled to a common time reference (CTR) 10, as shown in FIG. 14. In a possible embodiment, the CTR 10 is devised from the Coordinated Universal Time (UTC). In a possible embodiment, the access point 10100 is a firewall or, as it is called in FIG. 14, a Super Firewall given its enhanced functionality with respect to traditional firewalls. In a possible embodiment the network 10110 through which the access points 10100 are coupled is a backbone network.

In a possible embodiment the Super Firewall 10100 only removes jitter, while window control is realized within the end systems 10200, both according to traditional methods and according to new methods disclosed in the invention. A security signal from hidden software can be used to make sure that TCP implementation in end station 10200 behaves properly.

Figure 13:
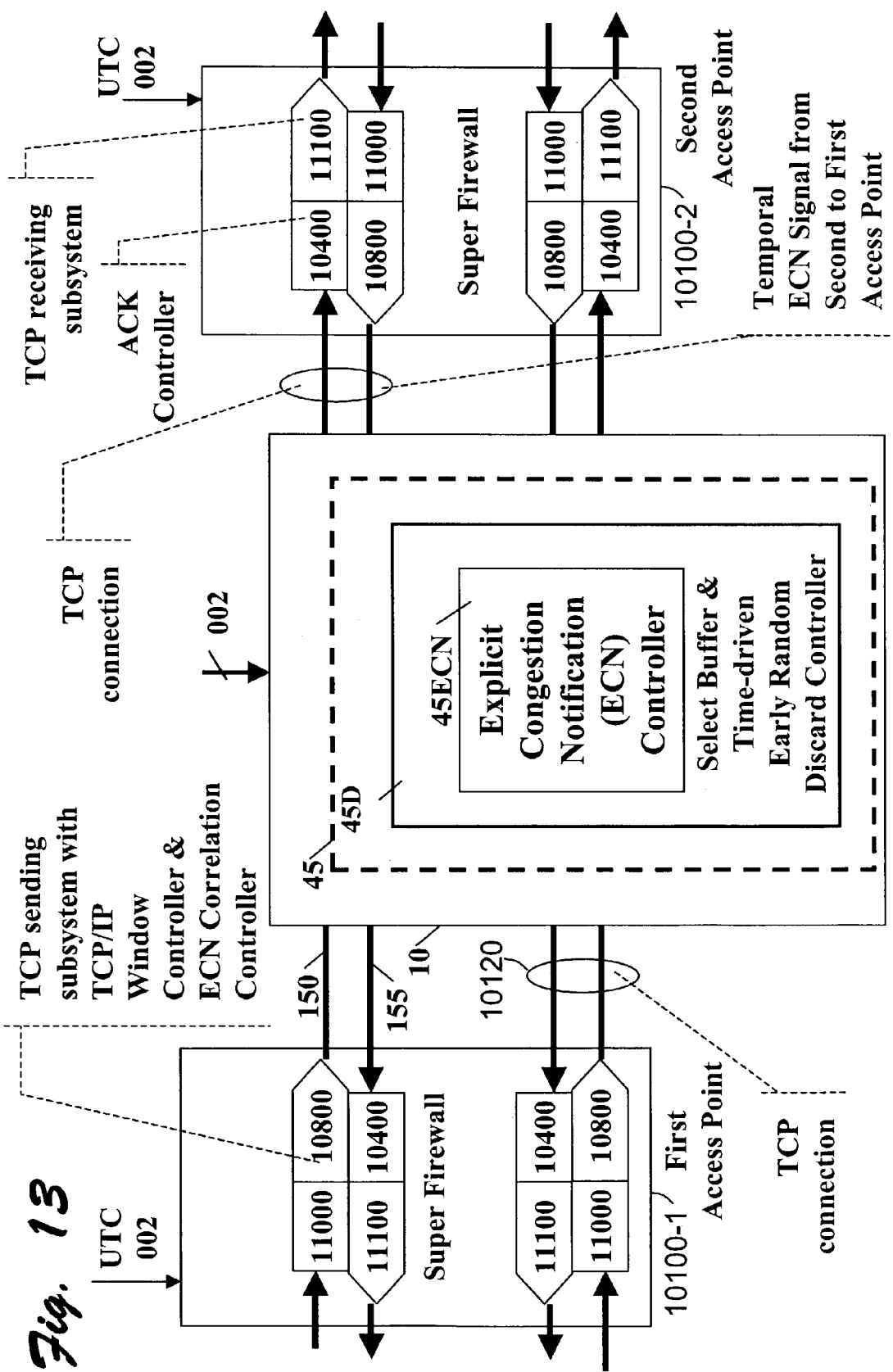
FIG. 13 is a schematic diagram of the local and end-to-end explicit congestion notification (ECN) operation.

In the system configuration shown in FIG. 13, the explicit congestion notification (ECN) controller 45ECN comprised within the select buffer & time-driven early random discard controller 45D included into at least one of the switches 10 on the path of a selected TCP connection between a first access point 10100-1 and a second access point 10100-2 generates an explicit congestion notification (ECN) signal that is carried to at least one of the end points of the selected TCP connection.

This disclosure presents a method for controlling the transmission of data packets in a system between a first access point 10100-1 and a second access point 10100-2 on each side of a network, the method comprising receiving and storing incoming data packets to be transmitted from the first access point, assigning a packet time-stamp based on the then current UTC, associating the packet time-stamp with the data packets to be transmitted, transmitting the data packets to the second access point, receiving and storing the data packets at the second access point, computing a target packet arrival time responsive to the packet time-stamp for the respective data packet, scheduling forwarding of the respective data packet responsive to the UTC and the target packet arrival time, scheduling receiver acknowledgement processing to generate an acknowledgement signal back to the first access point responsive to the UTC and the target packet arrival time, assigning and attaching the acknowledgement time-stamp to the acknowledgment signal, responsive to the UTC, sending the acknowledgement signal to the first access point, assigning a first window-size, defining a first number of data packets to be transmitted within a defined time period, receiving and storing the acknowledgement signal, computing a target acknowledgement arrival time responsive to the acknowledgement time-stamp and to the UTC and adaptively redefining the window-size responsive to the UTC and the target acknowledgment arrival time and the ECN signal.

A possible embodiment of the disclosed method for controlling data transmission correlates at least one of the ECN signals, wherein the adaptively redefining the window-size is responsive to at least one of: the UTC and the target acknowledgment arrival time and selected ones of the ECN signals.

A possible embodiment of the disclosed method for controlling data transmission comprises receiving and storing incoming data packets to be transmitted from the first access point, assigning a packet time-stamp based on a then current UTC, associating a future packet time-stamp with the data packets to be transmitted, transmitting the data packets to the second access point, assigning a first window-size, defining a first number of data packets to be transmitted within a defined time period, adaptively redefining the window-size responsive to the UTC and the ECN signal. The method for controlling data transmission further comprises storing the values of past window-sizes, correlating the ECN signals with selected ones of past window-sizes, wherein the adaptively redefining the window-size is responsive to at least one of: the UTC and the target acknowledgment arrival time and the ECN signal.

In a possible embodiment, the explicit congestion notification signal is carried by the explicit congestion notification field 10540 of a TCP message as depicted in FIG. 18A. In a possible embodiment the explicit congestion notification field 10540 contains at least one of a UTC time-stamp corresponding to the time in which the explicit congestion notification (ECN) controller 45ECN has identified congestion, the packet time-stamp 10500 associated to the packet that has caused the congestion to be identified, an indication of the congestion level, and the identifier of packets dropped due to the congestion.

In a possible implementation the explicit congestion notification signal is carried by the explicit congestion notification field 10540 of a TCP message traveling towards the TCP sender 10800, say within the first access point 10100-1, of the congested direction 150 of the selected TCP connection. This operational mode is also called backward ECN and the TCP message carrying the explicit congestion notification signal within its explicit congestion notification field 10540 travels on the other direction 155 of the selected TCP connection and reaches the respective TCP receiver 10400 within the first access point 10100-1. The TCP receiver 10400, within the first access point 10100-1, of the other direction 155 of the selected TCP connection, signals the reception of the explicit congestion notification signal to its corresponding TCP sender 10800 within the first access point 10100-1, of the congested direction 150 of the selected TCP connection.

In an alternative embodiment, the explicit congestion notification signal is carried by the explicit congestion notification field 10540 of a TCP message traveling towards the TCP receiver 10400 of the congested direction 150 of the corresponding TCP connection. This operational mode is also called forward ECN. The TCP receiver 10400, say within the second access point 10100-2, of the congested direction 150 of the selected TCP connection signals the reception of the explicit congestion notification signal to its corresponding TCP sender 10800 within the second access point 10100-2, of the other direction 155 of the selected TCP connection. The corresponding TCP sender 10800 within the second access point 10100-2 transmits, within the explicit congestion notification field 10540 of a TCP message, the explicit congestion notification signal to the TCP receiver 10400, within the first access point 10100-1, of the other direction 155 of the selected TCP connection. The TCP receiver 10400, within the first access point 10100-1, of the other direction 155 of the selected TCP connection, signals the reception of the explicit congestion notification signal to its corresponding TCP sender 10800 within the first access point 10100-1, of the congested direction 150 of the selected TCP connection.

In a possible embodiment the Window Controller 10820 within the TCP sender 10800 of the congested direction 150 of the selected TCP connection uses the explicit congestion notification (ECN) for controlling the TCP sliding window size and position. In a possible implementation the Window Controller 10820 uses at least one of the time-stamp associated with the received ECN information, a time-stamp 10500 associated with the packet that caused the ECN signal to be generated, and time-stamped historical information on the TCP window size for controlling the TCP sliding window size by correlating congestion data (received through ECN) and data about window size in time.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of data packet transmission control for controlling communications of data packets between a first node and a second node, a UTC (Universal Coordinated Time) signal coupled to each of the first node and the second node, wherein the UTC signal is comprised of UTC seconds which are divided into a predefined number of UTC time-frames, the method comprising:
   sending data packets from the first node to the second node within the UTC time-frames;
   receiving the data packets at the second node after a first defined delay;
   defining UTR (unique time reference) time-frames at the second node representative of the UTC time-frames delayed by the first defined delay;
   temporal mapping the UTR time-frames to respective ones of the UTC time-frames responsive to the UTC signal and to the first defined delay; and
   outputting the data packets from the second node after a predefined number of UTC time-frames responsive to the UTC signal and to the temporal mapping.

2. The method as in claim 1, further comprising:
   defining each of the UTC time-frames and the UTR time-frames as respectively further comprised of UTC time-frame delimiters and UTR time-frame delimiters (TFDs), wherein the temporal mapping is responsive to the UTR time-frame delimiters.

3. The method as in claim 1, further comprising:
   assigning and associating a time-stamp to the data packets at the sending, responsive to the UTC signal, wherein the temporal mapping is responsive to the time-stamp.

4. The method as in claim 2, further comprising:
   defining the UTR time-frames as further comprised of the UTR time-frame delimiters, wherein the UTR time-frame delimiters are further comprised of a time-stamp assigned to a respective one of the UTC time-frame delimiters at the sending, responsive to the UTC signal, wherein the temporal mapping is responsive to the time-stamp.

5. The method as in claim 1, wherein the outputting the data packets provides forwarding, the method further comprising:
   counting data units within the data packets to be forwarded to determine a respective data unit count;
   discarding respective selected ones of the data packets responsive to the respective data unit count exceeding a predefined number.

6. The method as in claim 5, further comprising:
   randomly selecting the respective selected ones of the data packets to be discarded, until the respective data unit count is less than a second predefined number.

7. The method as in claim 5, wherein each of the data packets is further comprised of a header portion, the method further comprising:
   selecting the respective selected ones of the data packets to be discarded responsive to the respective header portion for each of the respective selected ones of the data packets to be discarded, until the respective data unit count is less that a second predefined number.

8. The method as in claim 7, wherein the header portion is further comprised of at least one of: a priority field, a type of service field, a cell loss priority field, a hop count field, a time to live field, and a differentiated services field.

9. The method as in claim 1, further comprising:
choosing the predefined number of UTC time-frames from a set of predefined number of UTC time-frames.

10. The method as in claim 9, wherein the communications of data packets from the second node is over a predefined number of N+1 additional nodes, the method further comprising:
summing the predefined number of UTC time-frames for the first node and the second node, and not the additional nodes, to define a summed, predefined number of UTC time-frames; and
wherein the choosing is responsive to the summed predefined number.

11. The method as in claim 1, wherein the outputting further comprises:
counting the data units within the data packets to be forwarded to determine a data unit count; and
outputting an explicit congestion notification (ECN) signal responsive to a respective data unit count exceeding a predefined number.

12. The method as in claim 11, wherein the ECN signal is comprised of at least one of the following:
congestion time derived responsive to the UTC signal;
congestion level and the data unit count; and
IDs (identifications) of dropped data packets.

13. The method as in claim 12, wherein the IDs of dropped data packets are at least one of: a source IP address, a destination IP address, an IP port number, a source address, a destination address, a VCI label in ATM, a VPI label in ATM, a MPLS label, an Ethernet MAC source address, and an Ethernet MAC destination address.

14. The method as in claim 11, further comprising:
controlling the transmission of data packets in a system between a first access point and a second access point on each side of a network;
receiving and storing incoming data packets to be transmitted from the first access point, assigning a packet time-stamp based on the then current UTC signal;
associating the packet time-stamp with the data packets to be transmitted;
transmitting the data packets to the second access point;
receiving and storing the data packets at the second access point;
computing a target packet arrival time responsive to the packet time-stamp for the respective data packet;
scheduling forwarding of the respective data packet responsive to the UTC signal and the target packet arrival time;
scheduling receiver acknowledgement processing for generating an acknowledgement signal back to the first access point responsive to the UTC signal and the target packet arrival time;
assigning and attaching an acknowledgement time-stamp to an acknowledgment signal, responsive to the UTC signal;
sending the acknowledgement signal to the first access point;
assigning a first window-size, defining a first number of data packets to be transmitted within a defined time period;
receiving and storing the acknowledgement signal;
computing a target acknowledgement arrival time responsive to the acknowledgement time-stamp and to the UTC signal; and
adaptively redefining the window-size responsive to the UTC signal and the target acknowledgment arrival time and the ECN signal.

15. The method as in claim 14, further comprising:
correlating at least one of a plurality of ECN signals,
wherein the adaptively redefining the window-size is responsive to at least one of: the UTC signal and the target acknowledgment arrival time and selected ones of the ECN signals.

16. The method as in claim 11, further comprising:
controlling the transmission of data packets in a system between a first access point and a second access point on each side of a network;
receiving and storing incoming data packets to be transmitted from the first access point, assigning a packet time-stamp based on a then current UTC signal;
associating a future packet time-stamp with the data packets to be transmitted;
transmitting the data packets to the second access point;
assigning a first window-size, defining a first number of data packets to be transmitted within a defined time period; and
adaptively redefining the window-size responsive to the UTC signal and the ECN signal.

17. The method as in claim 16, further comprising:
storing the values of past window-sizes;
correlating a plurality of ECN signals with selected ones of past window-sizes;
wherein the adaptively redefining the window-size is responsive to at least one of: the UTC signal and the target acknowledgment arrival time and the respective ECN signals.

18. A system of data packet transmission control for controlling communications of data packets between a first node and a second node, a UTC (Universal Coordinated Time) signal coupled to each of the first node and the second node, wherein the UTC signal is comprised of UTC seconds which are divided into a predefined number of UTC time-frames, the system comprising:
means for sending data packets from the first node to the second node within the UTC time-frames;
means for receiving the data packets at the second node after a first defined delay;
means for defining UTR (unique time reference) time-frames at the second node representative of the UTC time-frames delayed by the first defined delay;
a temporal mapping controller for mapping the UTR time-frames to respective ones of the UTC time-frames responsive to the UTC signal and to the first defined delay; and
means for outputting the data packets from the second node after a predefined number of UTC time-frames responsive to the UTC signal and to the temporal mapping.

19. The system as in claim 18, wherein each of the UTC time-frames and the UTR time-frames are respectively further comprised of UTC time-frame delimiters (TFDs) and UTR time-frame delimiters (TFDs), wherein the temporal mapping is responsive to the UTR time-frame delimiters.

20. The system as in claim 18, wherein the means for sending data packets is further comprised of:
means for assigning and associating a time-stamp to the data packets by the means for sending, responsive to the UTC signal, wherein the temporal mapping controller is responsive to the time-stamp.

21. The system as in claim 19, wherein the UTR time-frames are further comprised of the UTR time-frame delimiters (TFDs), wherein the UTR time-frame delimiters are further comprised of a time-stamp assigned to the respective UTC time-frame delimiter by the means for sending, responsive to the UTC signal, wherein the temporal mapping controller is responsive to the time-stamp.

22. The system as in claim 18, wherein the forwarding further comprises:
a best effort scheduling controller counting data units within the data packets to be forwarded to determine a data unit count; and
a select buffer and time-driven early random discard controller for discarding selected ones of the data packets responsive to the respective data unit count for the selected ones of the data packets exceeding a predefined number.

23. The system as in claim 22,
wherein the select buffer and time-driven early random discard controller randomly selects the selected ones of the data packets to be discarded, until the respective data unit count for the selected ones of the data packets is less than a second predefined number.

24. The system as in claim 22, wherein each of the data packets is further comprised of a header portion, the system further comprising:
means for selecting the selected ones of the data packets to be discarded responsive to the respective header portion, until the respective data unit count for the selected ones of the data packets is less than a second predefined number.

25. The system as in claim 24, wherein the header portion is further comprised of at least one of a priority field, a type of service field, a cell loss priority field, a hop count field, a time to live field, and a differentiated services field.

26. The system as in claim 18, further comprising:
means for choosing the predefined number of UTC time-frames from a set of predefined number of UTC time-frames.

27. The system as in claim 26, wherein the communications of data packets from the second node is over a predefined number of N+1 additional nodes, the system further comprising:
means for summing the predefined number of UTC time-frames for all of the first node and the second node, and not the additional nodes, to define a summed, predefined number of UTC time-frames; and
wherein the means for choosing is responsive to the summed predefined number.

28. The system as in claim 27, wherein a select buffer and time-driven early random discard controller is used to provide the means for summing the predefined number of UTC time-frames.

29. The system as in claim 28, wherein the summed predefined number is encoded into the data packet by the select buffer and time-driven early random discard controller.

30. The system as in claim 19, wherein each of the time-frame delimiters is at least one of the following: a redundant serial codeword, an 8B/10B fiber channel redundant serial codeword, a 4B/5B FDDI redundant serial codeword, a pointer encoded in the SONET path overhead (POH), a pointer encoded in the SONET transport overhead (TOH), a position determined by counting data units, a control IP data packet, a control ATM cell, and a control MPLS data packet.

31. The system as in claim 18, wherein a predefined number of the UTC time-frames are grouped to at least one of: time cycles and super cycles.

32. A method for controlling the transmission of data packets in a system between a first access point and a second access point on each end of a network, coupled to a UTC (Universal Coordinated Time) signal, the method comprising:
receiving and storing incoming data packets to be transmitted from the first access point;
assigning a packet time-stamp based on a then current UTC signal;
associating the packet time-stamp with the data packets to be transmitted;
transmitting the data packets to the second access point;
receiving and storing the data packets at the second access point;
computing a target packet arrival time responsive to the packet time-stamp for a respective data packet;
scheduling forwarding of the respective data packet responsive to the UTC signal and the target packet arrival time; and
scheduling receiver acknowledgement processing to generate an acknowledgement signal back to the first access point responsive to the UTC signal and the target packet arrival time.

33. The method as in claim 32, further comprising:
assigning and attaching an acknowledgement time-stamp to the acknowledgment signal, responsive to the UTC signal; and
sending the acknowledgement signal to the first access point.

34. The method as in claim 33, further comprising:
assigning a first window-size, defining a first number of data packets to be transmitted within a defined time period;
receiving and storing the acknowledgement signal;
computing a target acknowledgement arrival time responsive to the acknowledgement time-stamp and to the UTC signal; and
adaptively redefining the window-size responsive to the UTC signal and the target acknowledgment arrival time.

35. The method as in claim 34, further comprising:
assigning an acknowledgement arrival time to the acknowledgement signal as it is received; and
adaptively redefining a targeted acknowledgement arrival time responsive to the UTC signal, the time-stamp and the acknowledgement arrival time.

36. The method as in claim 34, further comprising:
assigning an acknowledgment delay-bound defining an expected time delay between the sending of the acknowledgement signal until adaptively redefining the window-size; and
adapting the acknowledgment delay-bound responsive to the UTC signal and the acknowledgement time-stamp.

37. The method as in claim 32, further comprising:
assigning a packet-bound, defining an expected time delay between transmission from the first access point until receiving acknowledgement processing; and
adapting the packet delay-bound, responsive to the UTC signal and the packet time-stamp.

38. A data packet communications control system for control of communications of data packets across a network between a first access point and a second access point, the system comprising:

- means for receiving and storing incoming data packets to be transmitted from the first access point, and for assigning and associatively storing a packet time-stamp based on a then current UTC (Universal Coordinated Time) signal;
- a time stamping subsystem for associating a future packet time-stamp with the data packets to be transmitted;
- means for transmitting the data packets to the second access point;
- means for receiving and storing the data packets at the second access point;
- an adaptive packet jitter removal controller for computing a target packet arrival time responsive to the packet time-stamp for a respective data packet;
- the adaptive packet jitter removal controller further comprising:
- means for scheduling forwarding of the respective data packet responsive to the UTC signal and the target packet arrival time; and
- means for scheduling receiver acknowledgement processing by a receiver controller to generate an acknowledgement signal back to the first access point responsive to the UTC signal and the target packet arrival time.

39. The system as in claim 38, wherein the receiver controller further comprises means for assigning and attaching an acknowledgement time-stamp to the acknowledgment signal, responsive to the UTC signal, further comprising:

- an ACK transmission subsystem comprising means for sending the acknowledgement signal to the first access point.

40. The system as in claim 39, further comprising:

- a window controller for assigning a first window-size, defining a first number of data packets to be transmitted within a defined time period;
- wherein the adaptive packet jitter removal controller further comprises means for receiving and storing the acknowledgement signal and means for computing a target acknowledgement arrival time responsive to the acknowledgement time-stamp and to the UTC signal; and
- wherein the window controller further comprises means for adaptively redefining the window-size responsive to the UTC signal and the target acknowledgment arrival time.

41. The system as in claim 40, wherein the adaptive packet jitter removal controller further comprises:

- means for assigning an acknowledgement arrival time to the acknowledgement signal as it is received; and
- means for adaptively redefining a targeted acknowledgement arrival time responsive to the UTC signal, the time-stamp and the acknowledgement arrival time.

42. The system as in claim 40, wherein the adaptive packet jitter removal controller further comprises:

- means for assigning an acknowledgment delay-bound, defining an expected time delay between the sending of the acknowledgement signal until adaptively redefining the window-size; and
- means for adapting the acknowledgment delay-bound responsive to the UTC signal and the acknowledgement time-stamp.

43. The system as in claim 38, wherein the adaptive packet jitter removal controller further comprises:

- means for assigning a packet-bound, defining an expected time delay between transmission from the first access point until receiver acknowledgement processing; and
- means for adapting the packet delay-bound, responsive to the UTC signal and the packet time-stamp.

* * * * *